(12) United States Patent
Ohno et al.

(10) Patent No.: US 8,533,785 B2
(45) Date of Patent: Sep. 10, 2013

(54) SYSTEMS AND METHODS FOR MANAGING THE OPERATION OF MULTIPLE VIRTUAL MACHINES AMONG MULTIPLE TERMINAL DEVICES

(75) Inventors: Takashi Ohno, Kawasaki (JP); Ryo Miyamoto, Kawasaki (JP); Koichi Yamasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 238 days.

(21) Appl. No.: 13/028,497

(22) Filed: Feb. 16, 2011

(65) Prior Publication Data

US 2011/0202977 A1 Aug. 18, 2011

(30) Foreign Application Priority Data

Feb. 18, 2010 (JP) .................................. 2010-33708

(51) Int. Cl.
*G06F 11/30* (2006.01)
*G06F 17/30* (2006.01)
*G06F 7/04* (2006.01)

(52) U.S. Cl.
USPC ...................................... 726/4; 726/27; 718/1

(58) Field of Classification Search
USPC ........................................... 718/1; 726/4, 27
See application file for complete search history.

(56) References Cited

U.S. PATENT DOCUMENTS

| 7,640,330 B2 | 12/2009 | Haruna et al. | |
|---|---|---|---|
| 8,301,686 B1* | 10/2012 | Appajodu et al. | 709/201 |
| 8,341,213 B2* | 12/2012 | Heim | 709/203 |
| 2005/0268298 A1* | 12/2005 | Hunt et al. | 718/1 |
| 2008/0086729 A1* | 4/2008 | Kondoh et al. | 718/1 |
| 2008/0104588 A1* | 5/2008 | Barber et al. | 718/1 |
| 2008/0201711 A1* | 8/2008 | Amir Husain | 718/1 |
| 2009/0216975 A1* | 8/2009 | Halperin et al. | 711/162 |
| 2009/0307761 A1* | 12/2009 | Iyoda | 726/4 |
| 2009/0319580 A1* | 12/2009 | Lorenz et al. | 707/203 |
| 2010/0070870 A1* | 3/2010 | Halperin et al. | 715/742 |
| 2010/0192150 A1* | 7/2010 | Grobman et al. | 718/1 |
| 2010/0251255 A1* | 9/2010 | Miyamoto et al. | 718/104 |

(Continued)

FOREIGN PATENT DOCUMENTS

| JP | 2003-87237 A | 3/2003 |
|---|---|---|
| JP | 4242819 | 3/2009 |
| JP | 2009-245288 A | 10/2009 |

OTHER PUBLICATIONS

Wei, Jinpeng et al. "Managing Security of Virtual Machine Images in a Cloud Environment", Nov. 2009.*

(Continued)

*Primary Examiner* — Michael Simitoski
(74) *Attorney, Agent, or Firm* — Fujitsu Patent Center

(57) ABSTRACT

An information processing device includes: a connection monitoring unit performs determining whether a first external device is connected, and determining whether a receiving unit receives the request from the first or second external device, wherein when the connection monitoring unit determines that the first external device is not connected, a usage permission/prohibition determining unit updates the usage permission/prohibition information stored in a management table so that the usage permission/prohibition information indicates that use of a first virtual computer is prohibited, and wherein when the connection monitoring unit determines that the receiving unit receives the request from the second external device and that the first external device is connected, the usage permission/prohibition determining unit transmits, to the first external device, information that instructs the first external device to prohibit use of a second virtual computer.

15 Claims, 24 Drawing Sheets

(56) References Cited

U.S. PATENT DOCUMENTS

2011/0099608 A1* 4/2011 Queck et al. .................. 726/4
2011/0154333 A1* 6/2011 Miyamoto et al. ............ 718/1
2011/0185355 A1* 7/2011 Chawla et al. ................ 718/1
2012/0096271 A1* 4/2012 Ramarathinam et al. ..... 713/172

OTHER PUBLICATIONS

VMware, Inc., "View Manager Administration Guide", View Manager 3.1, May 27, 2009 (includes English translation).

* cited by examiner

FIG. 5

| USER ID | PASSWORD | VM_ID | VM INFORMATION | ADDRESS OF GUEST OS OF SERVER DEVICE | ADDRESS OF DEVICE TO BE MONITORED FOR CONNECTION | ADDRESS OF GUEST OS OF TERMINAL DEVICE | USE OF VM IS PERMITTED OR PROHIBITED |
|---|---|---|---|---|---|---|---|
| USER_A | PASS_A | VM_A | a.vmdisk | 192.168.1.2 | 192.168.1.2 | 192.168.2.2 | PERMITTED |
| USER_B | PASS_B | VM_B | b.vmdisk | 192.168.1.3 | 192.168.1.3 | 192.168.2.3 | PROHIBITED |
| USER_C | PASS_C | VM_C | c.vmdisk | 192.168.1.4 | 192.168.1.4 | 192.168.2.4 | PROHIBITED |

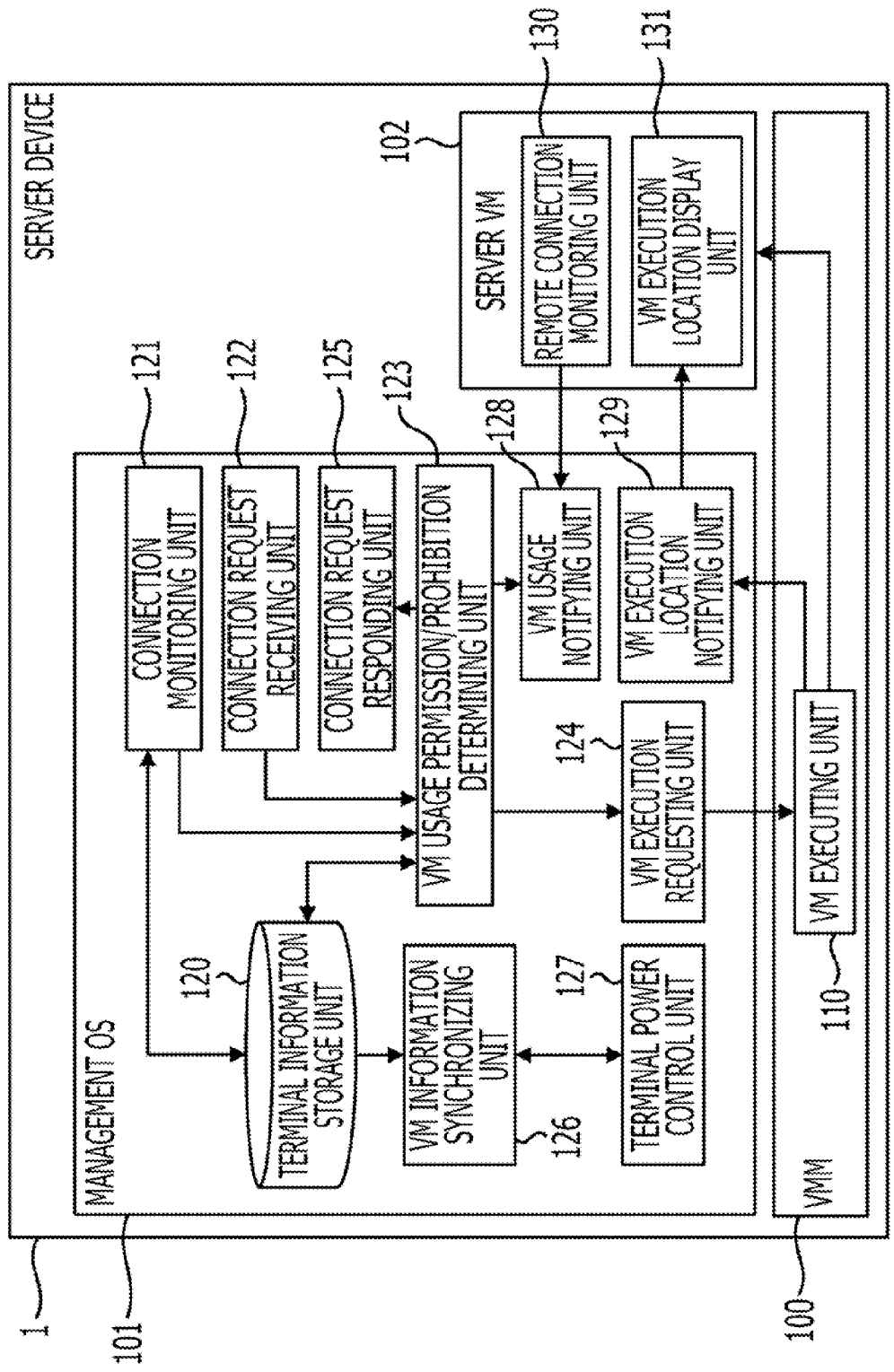

FIG. 20

```
SETTING OF TIME PERIOD FOR USE OF TERMINAL VM

SELECT USER
    [ USER_A  ▽ ]         ☐ SELECT ALL USERS

TIME PERIOD FOR
USE OF TERMINAL VM :
    [    5    ] HOURS
        [ OK ]            [ CANCEL ]
```

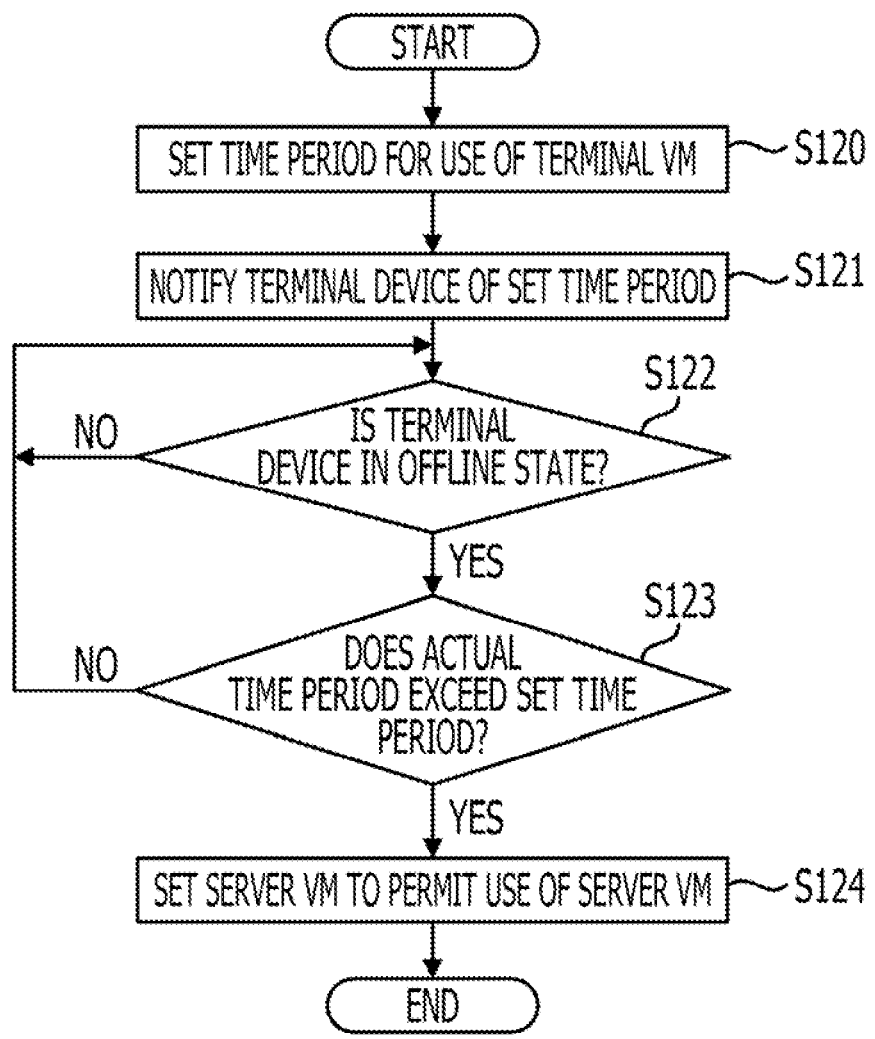

SYSTEMS AND METHODS FOR MANAGING THE OPERATION OF MULTIPLE VIRTUAL MACHINES AMONG MULTIPLE TERMINAL DEVICES

CROSS-REFERENCE TO RELATED APPLICATIONS

This application is based upon and claims the benefit of priority of the prior Japanese Patent Application No. 2010-33708, filed on Feb. 18, 2010, the entire contents of which are incorporated herein by reference.

FIELD

The embodiments relate to an information processing device, a computer system, and a program, which allow a virtual computer to be transferred to a corresponding terminal device from a server device on which the virtual computer operates.

BACKGROUND

There is a system that causes a plurality of virtual computers to operate on a single server device and assigns the virtual computers to multiple terminal devices, respectively, while the terminal devices are connected to the server device through a network. The virtual computers are called virtual machines (VMs). In the system, operating systems (OSs) run on the virtual machines that operate on the server device. Users operate the terminal devices so that the terminal devices each use the OS of the virtual machine assigned to the terminal device. In other words, the server device is used as a desktop computer for the terminal devices.

JP4242819 discusses a technique for transferring virtual machines between the server device and the terminal devices through a network. In JP4242819, information (data) that is used to cause each of the virtual machines to operate on the server device is synchronized between the server device and the terminal device so that an operating environment that is the same as the server device is achieved in the terminal device. Thus, even when the terminal device is in an offline state or is not connected to the server device, a user operates the terminal device so that the terminal device uses the virtual machine.

SUMMARY

According to an aspect of the invention, an information processing device includes: a management table that stores usage permission/prohibition information that indicates whether use of the first virtual computer is permitted; a usage permission/prohibition determining unit that updates the usage permission/prohibition information stored in the management table and controls, on the basis of the usage permission/prohibition information, whether use of the first virtual computer is permitted; a connection monitoring unit that monitors a first external device on which a second virtual computer to which the first virtual computer is switched operates and a second external device that uses the first virtual computer and on which the second virtual computer does not operate; and a receiving unit that receives a request to start using the first virtual computer from each of the first and second external devices, wherein the connection monitoring unit performs determining whether the first external device is connected, and determining whether the receiving unit receives the request from the first or second external device, wherein when the connection monitoring unit determines that the first external device is not connected, the usage permission/prohibition determining unit updates the usage permission/prohibition information stored in the management table so that the usage permission/prohibition information indicates that use of the first virtual computer is prohibited, and wherein when the connection monitoring unit determines that the receiving unit receives the request from the second external device and that the first external device is connected, the usage permission/prohibition determining unit transmits, to the first external device, information that instructs the first external device to prohibit use of the second virtual computer.

The object and advantages of the invention will be realized and attained by at least the features, elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 is a diagram schematically illustrating a VM management table.

FIG. 15 is a block diagram illustrating functions that are included in the server device.

FIG. 20 is a diagram illustrating an example of a screen for setting a time period for use of a terminal VM.

FIG. 24 is a flowchart of a process that is performed by the server device.

DESCRIPTION OF EMBODIMENTS

Figure 1:
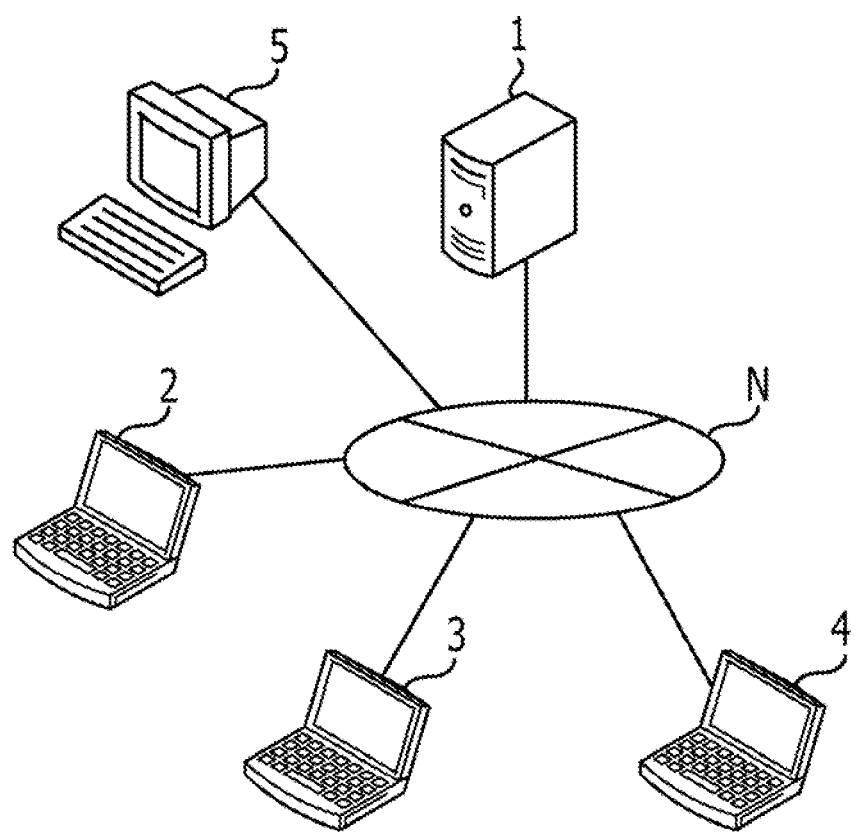
FIG. 1 is a diagram schematically illustrating a computer system according to an embodiment.

When a virtual machine operates on both a server device and a terminal device, there is a possibility that the same virtual machine is used on the server device and the terminal device.

For example, when the virtual machine that operates on the server device is accessed by multiple terminal devices, the virtual machine is exclusively used by one of the terminal devices. In this case, when the terminal devices that access the virtual machine are managed, an exclusive process can be performed without a problem. For example, when the server device and one of the terminal devices are set as a pair, and an environment in which the virtual machine operates on both the server device and the one of the terminal devices is provided, the virtual machine that operates on both the server device and the terminal device is exclusively used. In this case, when the server device and the one of the terminal devices are specified and synchronized with each other through online access, the exclusive process can be performed without a problem.

This restriction may limit convenience for users. An information processing device is provided, which allows each of virtual machines to be exclusively used without a problem even when the virtual machines that operate on a server device are used by multiple terminal devices, respectively, so that the virtual machines are switched between the server device and the terminal devices and operated. It is, therefore, possible to substantially prevent the convenience for users from being limited.

The information processing device, a computer system and a program are provided, which allow the same virtual machine to exclusively operate on each of different devices.

The information processing device disclosed herein includes a virtual machine monitor that causes a first virtual computer to operate. The information processing device allows the first virtual computer to be used by an external device. The external device includes a first external device and a second external device. The first virtual computer is switched to a second virtual computer so that the second virtual computer operates on the first external device. The second virtual computer does not operate on the second external device. The information processing device determines whether or not the first external device is connected to the information processing device. When the information processing device determines that the first external device is not connected to the information processing device, the information processing device prohibits use of the first virtual computer. The information processing device receives a request to start using the first virtual computer from the first or second external device. The information processing device determines whether the request to start using the first virtual computer is transmitted by the first or second external device. When the information processing device determines that the request to start using the first virtual computer is transmitted by the second external device and that the first external device is connected to the information processing device, the information processing device transmits, to the first external device, information that instructs the first external device to prohibit use of the second virtual computer.

From a perspective of the information processing device disclosed herein, when information on the virtual computers that are managed using the same ID is synchronized between the information processing device disclosed herein and the external device, and one of the virtual computers is switched to the other of the virtual computers after the synchronization, and the other of the virtual computers exclusively operates, one of the virtual computers, which operates on the information processing device and the external device, is set so that use of the one of the virtual computers is prohibited. It is, therefore, possible to prevent the virtual computers from being simultaneously used.

The information processing device disclosed herein, the computer system disclosed herein and the program disclosed herein are described below with reference to the accompanying drawings.

First Embodiment

FIG. 1 is a diagram schematically illustrating a computer system according to a first embodiment.

The computer system according to the present embodiment includes a server device 1 and a plurality of terminal devices 2, 3 and 4. The server device 1 serves as an information processing device. The server device 1 is connected to the terminal devices 2, 3 and 4 via cables or wirelessly through a network N. The network N is a local area network (LAN), a wide area network (WAN) or the like.

A virtual machine monitor (VMM) that serves as a virtualization program is executed on the server device 1, while multiple virtual machines (VMs) operate on the VMM. The VMM is a program that assigns resources (such as a central processing unit (CPU) and a read-only memory (ROM)) of the server device 1 to the VMs and allows the resources to be used by the VMs. The VMs are virtual computers that each independently execute an OS and an application in a similar manner to a physical computer. The VMs are assigned to the terminal devices 2, 3 and 4 (connected to the server device 1), respectively, so that the VMs are used by the terminal devices 2, 3 and 4 through the network N, respectively. The server device 1 may be a personal computer (hereinafter referred to as a PC) that includes a keyboard, a monitor and the like.

The terminal devices 2, 3 and 4 may be laptop computers that each include a keyboard, a mouse, a monitor and the like, for example. The terminal devices 2, 3 and 4 are connected to the server device 1 through the network N, while the VMs (hereinafter referred to as server VMs) that operate on the server device 1 are assigned to the terminal devices 2, 3 and 4, respectively. Each of the terminal devices 2, 3 and 4 may use, through the network N, the VM assigned to the terminal device. For example, each of the terminal devices 2, 3 and 4 transmits, to the server VM assigned to the terminal device 2, 3 and 4, respectively, a signal generated by an operation with the keyboard or mouse of the terminal device, receives the results of a process performed by the server VM from the server VM, and displays the results on the monitor of the terminal device. In the following description, the terminal device 2 is described below.

The terminal device 2 executes the VMM in a similar manner to the server device 1, and the VM operates on the VMM. In this case, the VM that has the same information as the server VM operates on the VMM in the terminal device 2. For example, VM information that is held by the server device 1 is synchronized with VM information that is held by the terminal device 2 so that the server device 1 and the terminal device 2 have the same VM information. The VM information includes information provided to implement an operating environment in which the VM operates; and information generated by the operating VM and stored (in a memory and a HDD). Thus, the VM that has the same VM information as the server VM operates on the VMM in the terminal device 2.

The terminal device 2 may be a desktop PC, a set top box (connected to the monitor), a PDA, a mobile phone or the like. The number of terminal devices connected to the server device 1 may be one or two or four or more.

The server device 1 is connected to a thin client terminal 5 through the network N. The thin client terminal 5 is a computer that does not include a large-capacity storage medium such as a hard disk. The VM that operates on the server device 1 and is assigned to any of the terminal devices 2, 3 and 4 is assigned to the thin client terminal 5. In the following description, the VM that is assigned to the terminal device 2 is assigned to the thin client terminal 5, while the terminal device 2 and the thin client terminal 5 are operated by the same user. The thin client terminal 5 may use, through the network N, the server VM assigned to the terminal device 2. The terminal device 2 and the thin client terminal 5 may use the same server VM that operates on the server device 1.

The thin client terminal 5 may be connected to the server device 1 through a network that is different from the network N. In addition, the thin client terminal 5 may be directly connected to the server device 1 without any network. Furthermore, the thin client terminal 5 may be a laptop PC provided with a hard disk and the like; a desktop PC provided with a hard disk and the like; a PDA; or the like. In addition, a plurality of thin client terminals 5 that are of the same type as the terminal device 2 may be connected to the server device 1. The thin client terminal 5 may be operated by a user who is different from the user of the terminal device 2.

In the computer system, when the server VM of the server device 1 is used by either the terminal device 2 or the thin client terminal 5, the server VM cannot be used by the other of the devices 2 and 5. Thus, it is possible to prevent the same server VM from being simultaneously used by the terminal device 2 and the thin client terminal 5. When the terminal device 2 is connected to the server device 1, the terminal device 2 uses the server VM. When the terminal device 2 is not connected to the server device 1, the terminal device 2 uses a VM (hereinafter referred to as a terminal VM) that operates on the terminal device 2. When the terminal device 2 cannot be connected to the network N, the terminal device 2 that is operated by the user may use the terminal VM that has the same VM information as the server VM.

When the terminal device 2 is in a state (hereinafter referred to as an offline state) in which the terminal device 2 is not connected to the network N, the server VM cannot be used by the thin client terminal 5. The reason is as follows. When the terminal device 2 is in the offline sate, there is a possibility that the terminal VM is being executed on the terminal device 2. In this case, if the server VM were used by the thin client terminal 5, the same VM (server VM and terminal VM) would be independently used by the server device 1 and the terminal device 2. Thus, when the terminal device 2 is in the offline state, the thin client terminal 5 is prohibited to use the server VM. Therefore, the terminal device 2 and the thin client terminal 5 cannot use the same VM simultaneously.

The computer system is described below in detail.

Figure 2:
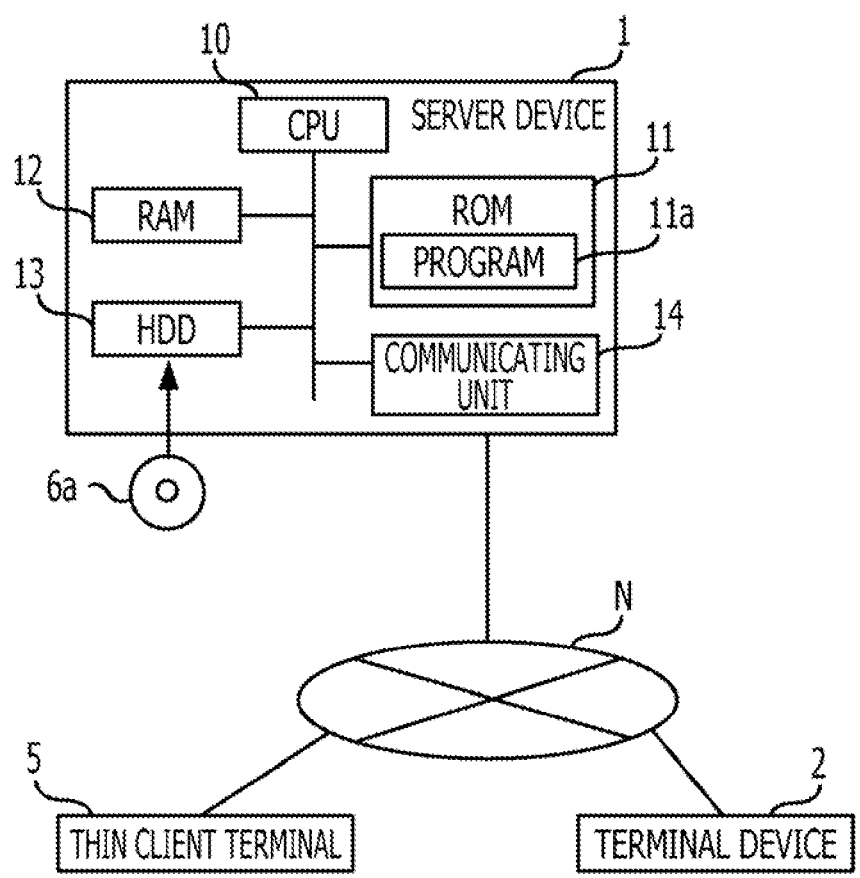
FIG. 2 is a block diagram illustrating a hardware configuration of the computer system.
Figure 3:
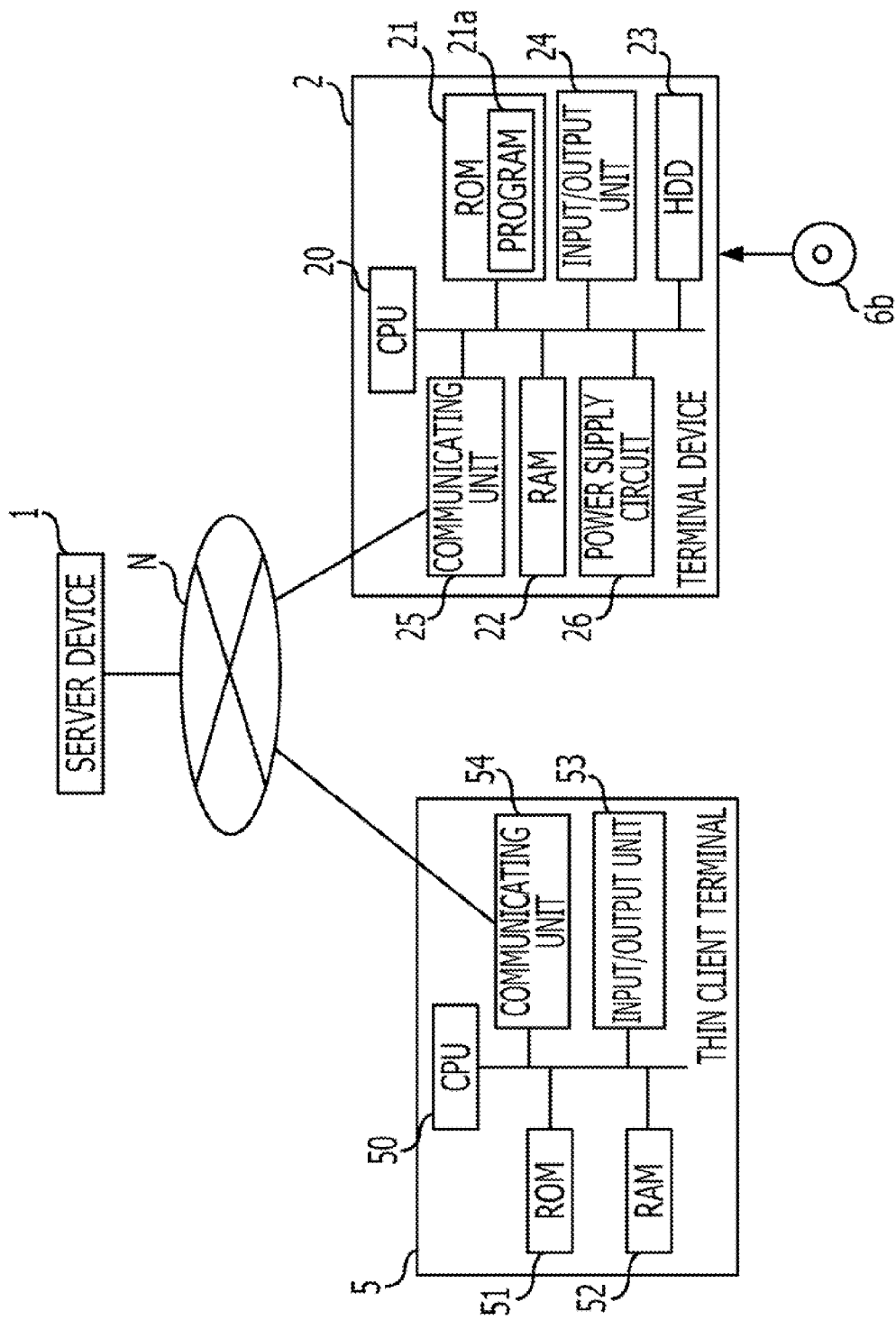
FIG. 3 is a block diagram illustrating another hardware configuration of the computer system.

FIGS. 2 and 3 are block diagrams each illustrating a hardware configuration of the computer system. The server device 1 and the terminal device 2 are described below.

The server device 1 includes hardware parts that are a CPU 10, ROM 11, a random access memory (RAM) 12, a hard disk drive (HDD) 13, a communicating unit 14 and the like. The hardware parts of the server device 1 are connected to each other through a bus. The CPU 10 reads a program 11a stored in the ROM 11 into the RAM 12 and executes the program 11a when necessary. In addition, the CPU 10 controls operations of the aforementioned hardware parts. The ROM 11 stores the program 11a. The RAM 12 is a static RAM (SRAM), a dynamic RAM (DRAM), a flash memory or the like. The RAM 12 temporarily stores various types of data that is generated at the time of execution of the program 11a. In this case, the program 11a is executed by the CPU 10.

The HDD 13 is a large-capacity storage device. The HDD 13 stores a VMM program, a management OS program, guest OS programs, application programs, data tables and the like. The data tables are used for various types of processes. The programs are each read into the RAM 12 by the CPU 10 and executed by the CPU 10. The program 11a may be installed in the HDD 13 through an external medium such as a CD-ROM 6a and used, or may be downloaded from the network and used.

The VMM program is a software program that achieves a virtual technique that allows the VMs to be operated on the server device 1. The CPU 10 starts operating as the VMM by executing the VMM program after startup of the server device 1. When the CPU 10 operates as the VMM, a virtual environment in which the VMs independently operate is provided to the server device 1.

The management OS program is a software program that achieves a function of starting and stopping the VMs on the VMM and a function of assigning resources such as the CPU 10 to the VMs and releasing the assignments. The CPU 10 starts operating as a management OS by executing the management OS program after the startup of the server device 1.

Each of the guest OS programs is a software program that is used to execute an OS on the VM. After the VM is executed, the CPU 10 starts operating as the OS (hereinafter referred to as a guest OS) by executing the guest OS program. The guest OS is Windows (registered trademark), Linux (registered trademark) or the like, for example. The guest OS generates data regarding a display screen on the basis of a performed process, while the display screen includes a character user interface (CUI), a graphic user interface (GUI) and the like, which are to be displayed. The generated data regarding the display screen is transmitted to the terminal device 2 (or the thin client terminal 5), and the display screen is displayed on the monitor of the terminal device 2 (or the thin client terminal 5). The guest OS receives control signals generated on the basis of operations with the keyboard and mouse of the terminal device 2 (or the thin client terminal 5). The guest OS performs various types of processes on the basis of the received control signals.

The application programs are software programs that are executed on the guest OSs, respectively. The server device 1 may read the application programs from an external memory that has, stored therein, the application programs, and the server device 1 may store the application programs in the large-capacity storage device 13. In addition, the server device 1 may download the application programs through the network and store the application programs in the HDD 13.

The terminal device 2 includes hardware parts that are a CPU 20, a ROM 21, a RAM 22, a HDD 23, an input/output unit 24, a communicating unit 25, a power supply circuit 26 and the like. The hardware parts of the terminal device 2 are connected to each other through a bus. The input/output unit 24 includes a keyboard, a mouse, a monitor and the like. The communicating unit 25 is connected to the network N and communicates with the other information processing device.

The CPU 20 reads a program 21a stored in the ROM 21 into the RAM 22 and executes the program 21a when necessary. The CPU 20 controls operations of the aforementioned hardware parts. The ROM 21 stores the program 21a, various types of data and the like. The RAM 22 is an SRAM, a DRAM, a flash memory or the like and temporarily stores various types of data that is generated at the time of execution of the control program 21a. In this case, the control program 21a is executed by the CPU 20.

The HDD 23 has, stored therein, a VMM program, a management OS program, a guest OS program, an application program, various types of data and the like in a similar manner to the server device 1. The program 21a may be installed in the HDD 23 through an external medium such as a CD-ROM 6b and used, or may be downloaded through the network and used.

The power supply circuit 26 is a circuit that controls power that is supplied to the terminal device 2. When a main power switch of the terminal device 2 is turned on or off, the power supply circuit 26 supplies power to the CPU 20 and the like or stops the supply of the power to the CPU 20 and the like. Even when the main power switch is in an OFF state, standby power is supplied so that the power supply circuit 26 and the communicating unit 25 are operated. Thus, even when the main power switch is in the OFF state, the communicating unit 25 transmits and receives a signal to and from the server device 1. When the main power switch is in the OFF state and the communicating unit 25 receives a power-on signal from the server device 1, the power supply circuit 26 turns on the main power switch. When the main power switch is in an ON state and the communicating unit 25 receives a power-off signal from the server device 1, the power supply circuit 26 turns off the main power switch. When the main power switch is in the ON state and the communicating unit 25 receives the power-on signal from the server device 1, or when the main power switch is in the OFF state and the communicating unit 25 receives the power-off signal from the server device 1, the power supply circuit 26 does not change the state of the main power switch. After the power supply circuit 26 cooperates with the guest OS and normally shuts down the guest OS, the circuit power circuit 26 may turn off the main power switch.

The thin client terminal 5 includes hardware parts that are a CPU 50, a ROM 51, a RAM 52, an input/output device 53, a communicating unit 54 and the like. The input/output device 53 includes a keyboard, a mouse, a monitor and the like. The communicating unit 54 connects the thin client terminal 5 to the network N. The hardware parts of the thin client terminal 5 are connected to each other through a bus. The CPU 50 reads a control program stored in the ROM 51 into the RAM 52 and executes the control program when necessary. The CPU 50 controls operations of the aforementioned hardware parts. The ROM 51 has, stored therein, the control program, various types of data and the like. The RAM 52 is an SRAM, a DRAM, a flash memory or the like and temporarily stores various types of data that is generated at the time of execution of the control program. In this case, the control program is executed by the CPU 50.

Next, functions that are achieved by the server device 1 and the terminal device 2 are described. The server device 1 and the terminal device 2 are included in the computer system.

Figure 4:
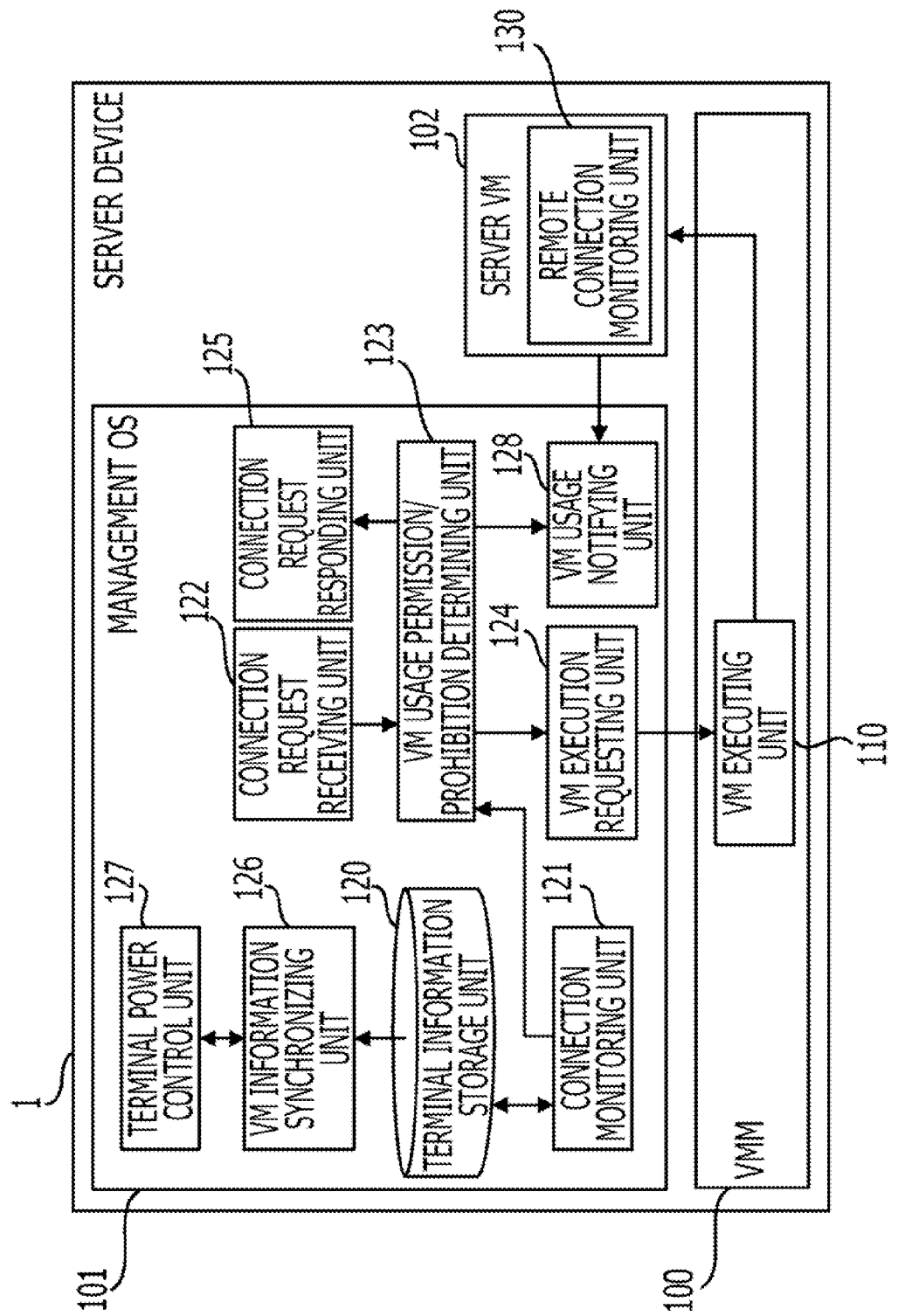
FIG. 4 is a block diagram illustrating functions that are included in a server device.

FIG. 4 is a block diagram illustrating functions that are included in the server device 1. When the CPU 10 executes the programs, the VMM designated by reference numeral 100 is executed on the server device 1 and the management OS designated by reference numeral 101 is executed on the VMM 100. The VMM 100 has a function that is a VM executing unit 110. The VM executing unit 110 starts and stops the server VM (designated by reference numeral 102) on the VMM 100 according to a request from the management OS 101. The plurality of server VMs operate on the VMM 100 and are assigned to the terminal devices 2, 3 and 4. In FIG. 4, the server VM 102 assigned to the terminal device 2 is illustrated.

The management OS 101 includes functions that are a terminal information storage unit 120, a connection monitoring unit 121, a connection request receiving unit 122, a VM usage permission/prohibition determining unit 123, a VM execution requesting unit 124, a connection request responding unit 125, a VM information synchronizing unit 126, a terminal power control unit 127, a VM usage notifying unit 128 and the like.

The terminal information storage unit 120 has, stored therein, a VM management table that is used to manage the server VMs. FIG. 5 is a diagram schematically illustrating the VM management table.

The VM management stores user IDs, passwords, VM_IDs, VM information and the addresses of the guest OSs of the server device 1, while the user ID, the password, the VM_ID, the VM information and the address of the guest OS of the server device 1 are associated with each other in each of rows of the VM management table. When the terminal device 2 or the thin client terminal 5 transmits a user ID and a password to the server device 1, the CPU 10 acquires the VM_ID corresponding to the transmitted user ID and the transmitted password and specifies the server VM 102 to be executed. Then, the CPU 10 acquires the VM information that is used to execute the specified VM 102. The VM information stored in the VM management table includes: information on a storage unit that stores the VM information; a file name; and the like. The CPU 10 acquires the address to be used to access the guest OS that runs on the executed server VM 102. Then, the CPU 10 transmits the acquired address to the terminal device 2 or the thin client terminal 5, which has transmitted the user ID and the password. Thus, the server VM 102 is executed on the server device 1 regardless of whether the terminal device 2 or the thin client terminal 5 uses the server VM 102.

In addition, the VM management table stores the addresses of the devices to be monitored whether or not the devices are connected to the network N; and the addresses of the guest OSs of the terminal devices. The address of the device to be monitored (whether or not the device is connected to the network N) and the address of the guest OS of the terminal device are associated with the user ID, the password, the VM_ID, the VM information and the address of the guest OS of the terminal device in each of the rows of the VM management table. The address of the device 2 to be monitored is an address that is assigned to the communicating unit 25 of the terminal device 2 used by the user who has the corresponding user ID. As described above, the communicating unit 25 functions even when the main power switch of the terminal device 2 is in the OFF state. The CPU 10 transmits a signal to the terminal device 2 that has the address of the device to be monitored. The CPU 10 determines whether or not to receive a response to the transmitted signal and monitors, on the basis of the determination result, whether or not the terminal device 2 is connected to the network N. The guest OS that has the address included in the VM management table is executed on the terminal VM 202 of the terminal device 2.

In addition, the VM management table stores information that indicates whether or not use of the server VM is permitted. In each of the rows of the management table, the information that indicates whether or not use of the server VM is permitted is associated with the user ID, the password, the VM_ID, the VM information and the address of the guest OS of the terminal device. When the terminal device 2 or the thin client terminal 5 transmits the user ID and the like, the CPU 10 determines whether or not use of the corresponding server VM 102 is permitted.

For example, the connection monitoring unit 121 periodically transmits a confirmation signal to the terminal device 2 according to the address (included in the VM management table) of the device to be monitored whether or not the device is connected to the network N. When the connection monitoring unit 121 receives a response to the transmitted confirmation signal, the connection monitoring unit 121 determines that the terminal device 2 is connected to the network N (or is in an online state). When the connection monitoring unit 121 does not receive the response to the transmitted confirmation signal, the connection monitoring unit 121 determines that the terminal device 2 is in the offline state. The connection monitoring unit 121 notifies the VM usage permission/prohibition determining unit 123 of the determination result.

The connection request receiving unit 122 receives a connection request (request to start using the server VM) from the terminal device 2 or the thin client terminal 5. The connection request is transmitted from the terminal device 2 or the thin client terminal 5 in order to start using the server VM. The connection request includes the user ID, the password and the like, which have been entered in the terminal device 2 or the thin client terminal 5. The management OS 101 receives the connection request and determines whether or not the connection request is transmitted from the terminal device 2. For example, the Internet Protocol (IP) address of the terminal device 2 is stored in the VM management table of the server device 1. When the device that transmits the connection request has the IP address stored in the VM management table, the management OS 101 determines that the terminal device 2 transmits the connection request. On the other hand, when the device that transmits the connection request does not have the IP address stored in the VM management table, the management OS 101 determines that the thin client terminal 5 transmits the connection request. The connection request receiving unit 122 receives the connection request and notifies the VM usage permission/prohibition determining unit 123 of the connection request.

The VM usage permission/prohibition determining unit 123 determines, on the basis of the VM management table, whether or not use of the server VM that corresponds to the user ID included in the received connection request is permitted. The VM usage permission/prohibition determining unit 123 updates the VM management table so that use of the server VM 102 is permitted when the terminal device 2 is in the online state and that use of the server VM 102 is prohibited when the terminal device 2 is in the offline state.

When use of the server VM 102 is permitted, the VM execution requesting unit 124 notifies the VM executing unit 110 (of the VMM 100) of the VM information on the server VM 102. Then, the VM executing unit 110 executes the server VM 102, and the resources of the server device 1 are assigned to the executed server VM 102. After the resources are assigned, the guest OS starts up and runs on the server VM 102.

The connection request responding unit 125 transmits, on the basis of the result of the determination made by the VM usage permission/prohibition determining unit 123, a response signal to the terminal device 2 or the thin client terminal 5, which has transmitted the connection request. When use of the server VM is permitted, the connection request responding unit 125 transmits the response signal together with the address of the guest OS that runs on the executed server VM 102. In this manner, the terminal device 2 or the thin client terminal 5 is connected (this connection is hereinafter referred to as a remote connection) to the guest OS that runs on the server VM 102. When use of the server VM 102 is prohibited, the connection request responding unit 125 transmits the response signal as an error.

The VM information synchronizing unit 126 periodically synchronizes the VM information between the server device 1 and the terminal device 2. For example, the VM information synchronizing unit 126 compares the time when the VM information held by the server device 1 has been updated with the time when the VM information held by the terminal device 2 has been updated so that the newer VM information is written over the older VM information. When the VM information held by the server device 1 is the older VM information, the VM information synchronizing unit 126 receives the VM information from the terminal device 2. When the VM information held by the terminal device 2 is the older VM information, the VM information synchronizing unit 126 transmits the VM information to the terminal device 2. The VM information may be copied every time the synchronization of the VM information is performed. In addition, the difference between the VM information and the previously synchronized VM information may be held as difference data, and the difference data may be synchronized between the server device 1 and the terminal device 2 so that the amount of data to be synchronized is reduced.

The terminal power control unit 127 transmits the power-on signal or the power-off signal according to the address that is included in the VM management table and assigned to the device to be monitored whether or not the device is connected to the network N. The terminal device 2 that receives the power-on signal or the power-off signal, and the power supply circuit 26 turns on or off the main power switch of the terminal device 2.

When the thin client terminal 5 uses the server VM 102, the VM usage notifying unit 128 notifies the terminal device 2 that the server VM 102 is used. In this case, the terminal device that is notified by the VM usage notifying unit 128 is prohibited to use the terminal VM. When the thin client terminal 5 terminates the use of the server VM 102, the VM usage notifying unit 128 notifies the terminal device 2 that the use of the server VM 102 is terminated. Thus, the terminal device 2 is permitted to use the terminal VM.

The guest OS starts up and runs on the server VM 102 executed on the VMM 100. A remote control server is executed on the guest OS that runs on the server VM 102. In this case, the remote control server is remotely controlled through the network. The remote control server is remotely connected to the terminal device 2 or the thin client terminal 5. The guest OS has a function that is a remote connection monitoring unit 130. The remote connection monitoring unit 130 monitors the remote connection of the remote control server. The remote connection monitoring unit 130 monitors whether or not the remote connection is terminated. The remote control server and the remote connection monitoring unit 130 may be executed on the management OS 101. In addition, although the management OS 101 is separated from the VMM 100, the functions of the management OS 101 may be included in the VMM 100. In addition, the functions of the management OS 101 may be present on a machine that is different from the machine that includes the VMM 100 so that the management OS 101 manages the VMM 100 through the network. In this case, a single management OS may manage a plurality of VMMs.

Figure 6:
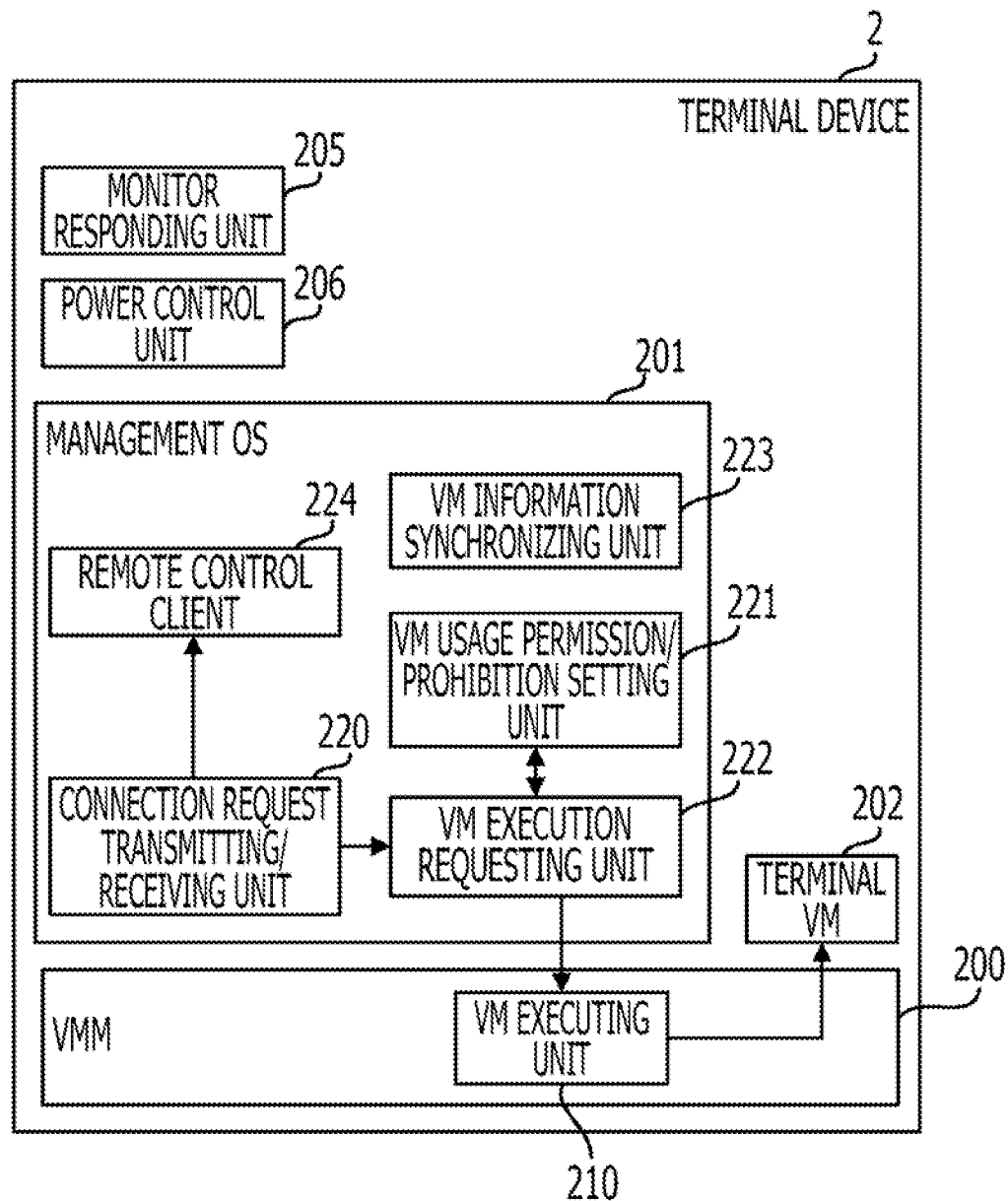
FIG. 6 is a block diagram illustrating functions that are included in a terminal device.

FIG. 6 is a block diagram illustrating functions that are included in the terminal device 2.

The terminal device 2 includes functions that are a monitor responding unit 205, a power control unit 206 and the like, which function regardless of whether the main power switch is in the ON or OFF state. The monitor responding unit 205 receives the confirmation signal from the connection monitoring unit 121 of the server device 1 and transmits, to the connection monitoring unit 121, a response to the confirmation signal. The power control unit 206 turns on or off the main power switch of the terminal device 2 on the basis of a user operation or the signal transmitted from the terminal power control unit 127 of the server device 1. For example, when the terminal device 2 receives the power-on signal from the server device 1, the power control unit 206 turns on the main power switch of the terminal device 2. For example, when the terminal device 2 receives the power-off signal from the server device 1, the power control unit 206 turns off the main power switch of the terminal device 2.

When the CPU 20 executes the programs, a VMM 200 is executed on the terminal device 2 and a management OS 201 runs on the VMM 200. The VMM 200 has a function that is a VM executing unit 210. The VM executing unit 210 starts and stops the terminal VM 202 on the VMM 200 on the basis of a request from the management OS 201.

The management OS 201 has functions that are a connection request transmitting/receiving unit 220, a VM usage permission/prohibition setting unit 221, a VM information synchronizing unit 223 and a remote control client 224.

When the terminal device 2 is in the online state and the terminal device 2 receives information (such as the entered user ID) on a user operation, the connection request transmitting/receiving unit 220 transmits the connection request to the server device 1. In addition, the connection request transmitting/receiving unit 220 receives the response signal from the server device 1. The connection request transmitting/receiving unit 220 executes the remote control client 224 so that the remote connection to the server VM 102 that is indicated by the response signal is established. When the terminal device 2 is on the offline state, the connection request transmitting/receiving unit 220 transmits a notification to the VM execution requesting unit 222. The connection request transmitting/receiving unit 220 receives a response signal from a VM execution requesting unit 222 and executes the remote control client 224 so that the remote connection to the terminal VM that is indicated by the response signal is established.

The VM usage permission/prohibition setting unit 221 sets the terminal VM to permit or prohibit use of the terminal VM according to the notification transmitted from the server device 1. For example, when the server device 1 notifies the terminal device 2 that the thin client terminal 5 uses the server VM 102, the VM usage permission/prohibition setting unit 221 prohibits use of the terminal VM. When the server device 1 notifies the terminal device 2 that the use of the server VM 102 is terminated, the usage permission/prohibition setting unit 221 permits use of the terminal VM.

When use of the terminal VM is permitted, the VM execution requesting unit 222 requests the VM executing unit 210 of the VMM 200 to execute the terminal VM. Then, the VM executing unit 210 executes the terminal VM, and resources of the terminal device are assigned to the executed terminal VM. After the resources are assigned, the guest OS starts up and runs on the terminal VM 202.

The VM information synchronizing unit 223 periodically synchronizes the VM information between the server device 1 and the terminal device 2. The remote control client 224 establishes the remote connection to the guest OS of the server VM 102 on the basis of the guest OS address included in the response signal received from the server device 1. In this manner, the terminal device 2 uses the server VM 102 that operates on the server device 1.

Next, a process that is performed by the computer system is described. The computer system includes the server device 1 and the terminal device 2 as described above.

Figure 7:
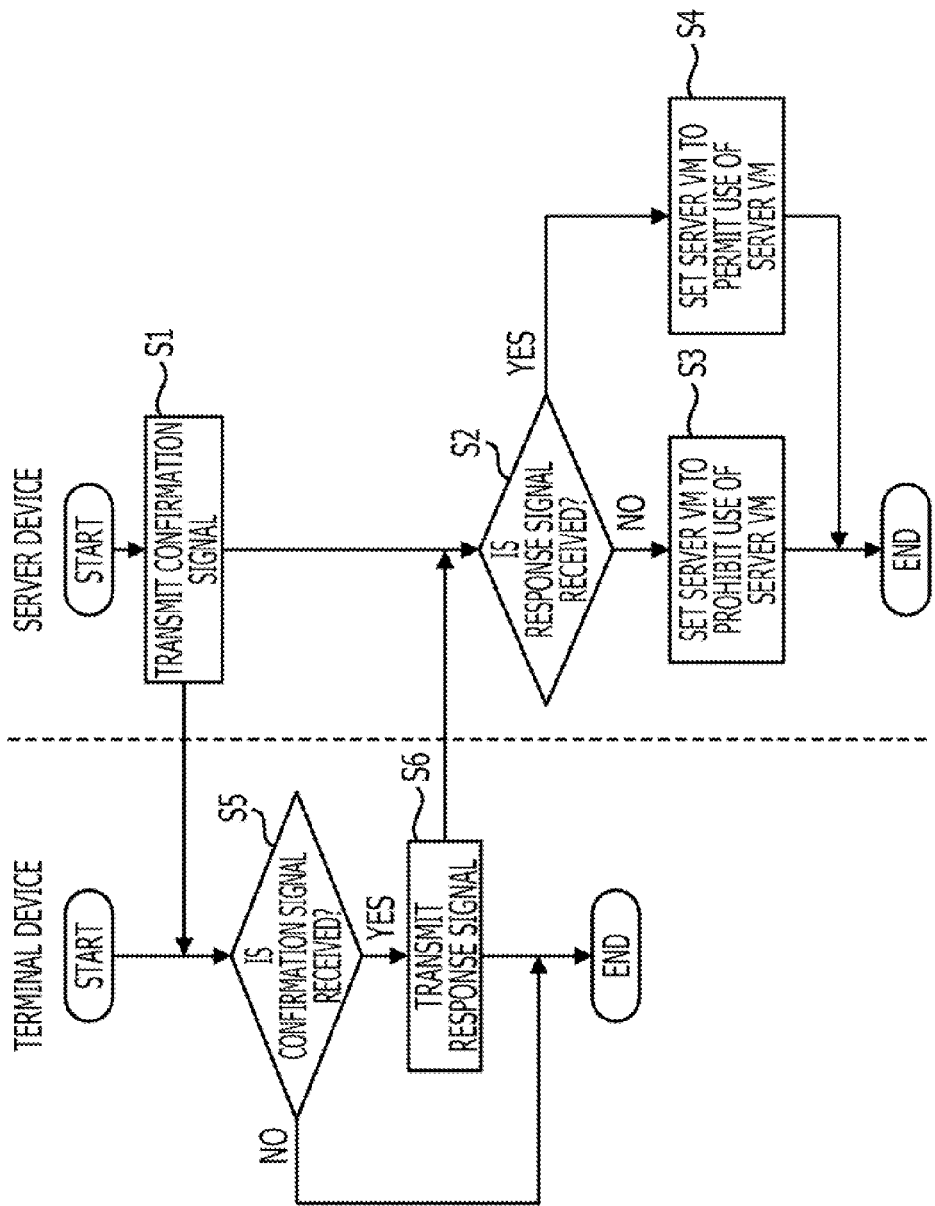
FIG. 7 is a flowchart of a process of monitoring a connection state of the terminal device.

FIG. 7 is a flowchart of a process of monitoring a connection state of the terminal device 2. In FIG. 7, a process that is performed by the server device 1 is illustrated together with a process that is performed by the terminal device 2, while the processes are periodically performed.

The VMM 100 is executed on the server device 1, and the management OS 101 starts up and runs on the VMM 100. The management OS 101 transmits the confirmation signal to the terminal device 2 in order to monitor the connection state of the terminal device 2 (in operation S1).

The monitor responding unit 205 is included in the terminal device 2 and functions regardless of whether the main power switch is in the ON or OFF state. The monitor responding unit 205 determines whether or not the monitor responding unit 205 receives the confirmation signal from the server device 1 (in operation S5). When the terminal device 2 is not connected to the network N, the terminal device 2 cannot receive the confirmation signal. When the monitor responding unit 205 does not receive the confirmation signal (No in operation S5), the process that is performed by the terminal device 2 is terminated. When the monitor responding unit 205 receives the confirmation signal (Yes in operation S5), the monitor responding unit 205 transmits the response signal to the server device 1 (in operation S6), and the process that is performed by the terminal device 2 is terminated.

The management OS 101 determines whether or not the management OS 101 receives the response signal from the terminal device 2 (in operation S2). When the terminal device 2 is in the offline state, the terminal device 2 cannot receive the confirmation signal from the server device 1 and the server device 1 does not receive the response signal from the terminal device 2. Thus, when the management OS 101 does not receive the response signal (No in operation S2), the management OS 101 determines that the terminal device 2 is in the offline state, and the management OS 101 sets the server VM 102 to prohibit use of the server VM 102 (in operation S3). For example, the management OS 101 updates the information that is included in the VM management table and indicates whether or not use of the server VM 102 is permitted. Since the management OS 101 updates the information that indicates whether or not use of the server VM 102 is permitted, the server VM 102 of the server device 1 is not used by the thin client terminal 5. After that, the process that is performed by the server device 1 is terminated. When the server VM 102 is already set to prohibit use of the server VM 102, operation S3 may be omitted.

When the management OS 101 receives the response signal from the terminal device (Yes in operation S2), the management OS 101 determines that the terminal device 2 is in the online state, and the management OS 101 sets the server VM 102 to permit use of the server VM 102 (in operation S4).

After that, the process that is performed by the server device 1 is terminated. When the server VM 102 is already set to permit use of the server VM 102, operation S5 may be omitted.

When the terminal device 2 is in the offline state, there is a possibility that the terminal VM 202 is being executed on the terminal device 2. If the thin client terminal 5 were permitted to use the server VM, the same VM (server VM and terminal VM) would be separately used by the server device 1 and the terminal device 2. Thus, when the terminal device 2 is in the offline state, the thin client terminal 5 is prohibited to use the server VM. Therefore, the terminal device 2 and the thin client terminal 5 cannot use the same VM simultaneously. When the state of the terminal device 2 is changed to the online state, use of the server VM may be permitted and the thin client terminal 5 may use the server VM 102.

Figure 8:
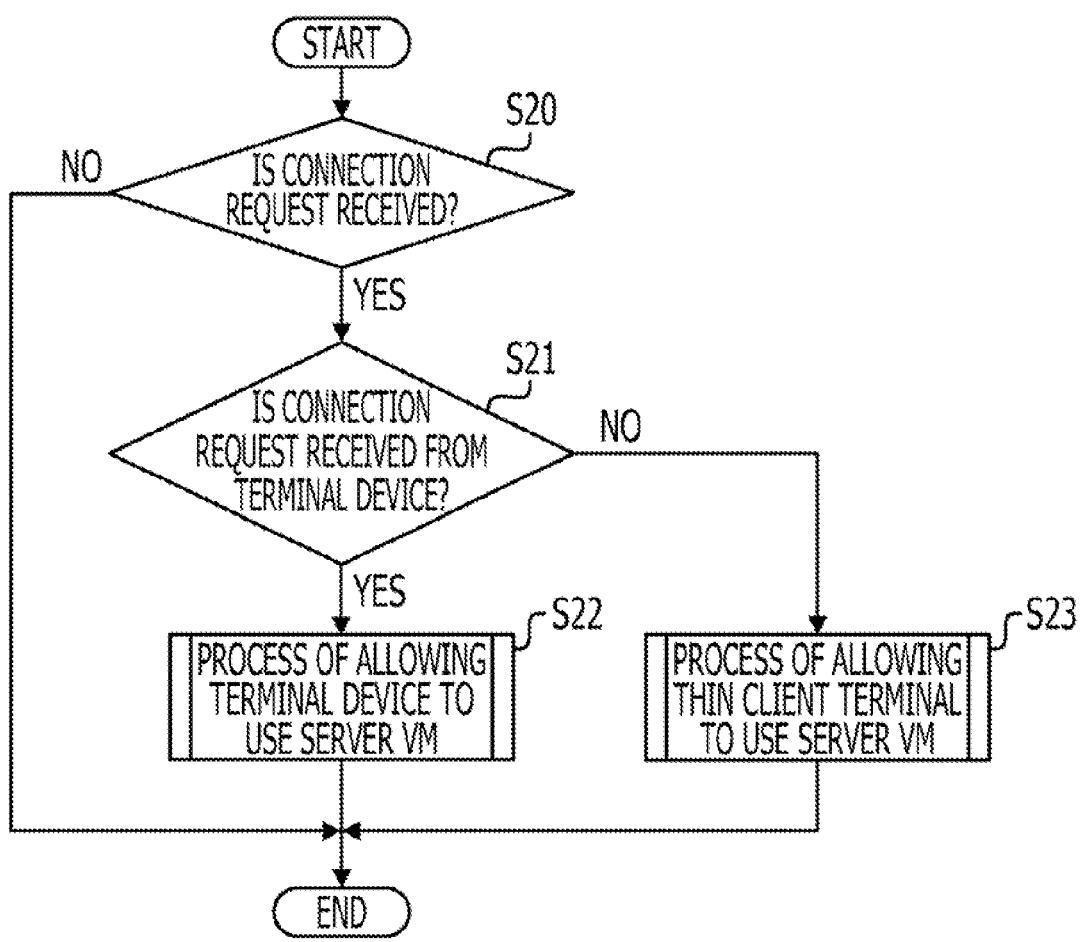
FIG. 8 is a flowchart of a process that is performed by the server device when the server device receives a connection request.

FIG. 8 is a flowchart of a process that is performed by the server device 1 when the server device 1 receives the connection request.

The management OS 101 determines whether or not the management OS 101 receives the connection request (in operation S20). When the management OS 101 does not receive the connection request (No in operation S20), the management OS 101 terminates the process. When the management OS 101 receives the connection request (Yes in operation S20), the management OS 101 determines whether or not the received connection request has been transmitted from the terminal device 2 (in operation S21). For example, the server device 1 has, stored therein, the Internet Protocol (IP) address of the terminal device 2 and the Internet Protocol (IP) address of the thin client terminal 5, and the management OS 101 specifies the device that has transmitted the connection request. When the management OS 101 receives the connection request from the terminal device 2 (Yes in operation S21), the management OS 101 performs a process of allowing the terminal device 2 to use the server VM (in operation S22).

Figure 9:
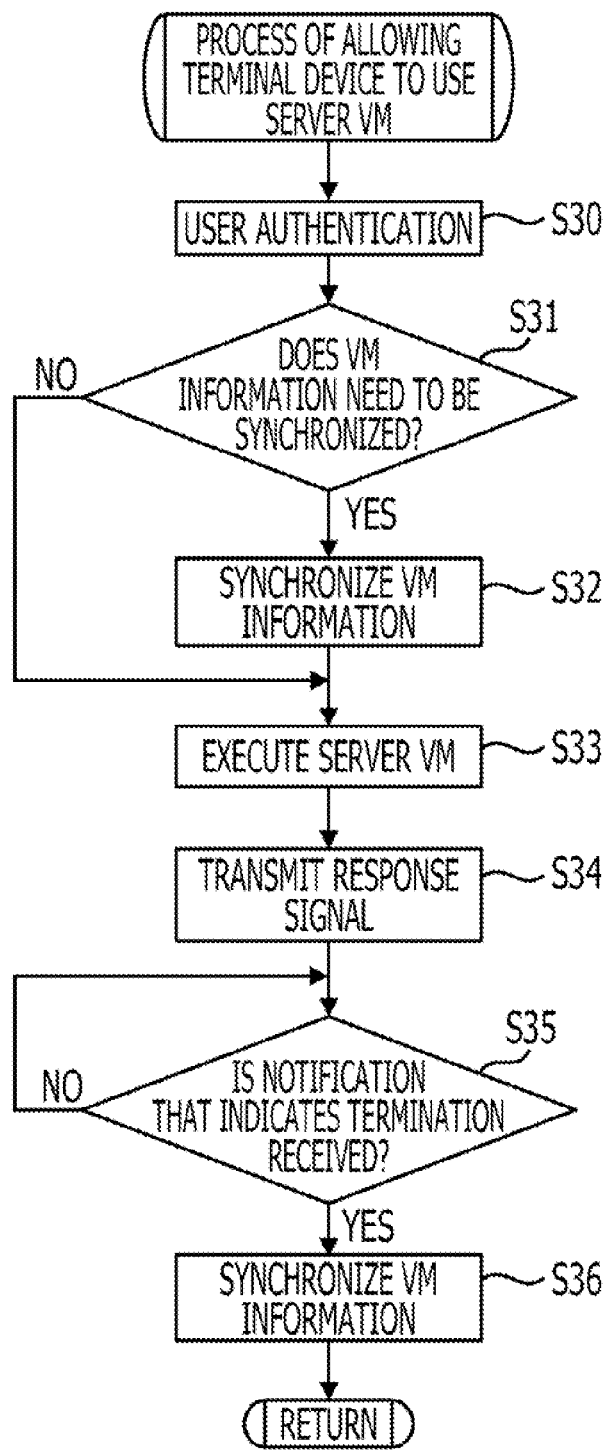
FIG. 9 is a flowchart of a process of allowing the terminal device to use a VM, while the process is performed by the server device.

FIG. 9 is a flowchart of the process of allowing the terminal device 2 to use the server VM, while the process is performed by the server device 1.

The management OS 101 performs a user authentication on the basis of the user ID and the like that are included in the connection request received from the terminal device 2 (in operation S30). When the user authentication cannot be successfully performed, the management OS 101 may transmit an error message to the terminal device 2. After operation S30, the management OS 101 determines whether or not the VM information needs to be synchronized between the server device 1 and the terminal device 2 (in operation S31). When the management OS 101 determines that the VM information needs to be synchronized between the server device 1 and the terminal device 2 (Yes in operation S31), the management OS 101 synchronizes the VM information between the server device 1 and the terminal device 2 (in operation S32). After the synchronization or when the management OS 101 determines that the VM information does not need to be synchronized (No in operation S31), the management OS 101 executes the server VM 102 (in operation S33) and transmits, to the terminal device 2, the address of the server VM 102 as a signal (response signal) in response to the received connection request (in operation S34). Thus, the server VM 102 of the server device 1 is accessed by the terminal device 2 so that the remote connection is established.

The management OS 101 determines whether or not the management OS 101 receives, from the terminal device 2, a notification that indicates that the remote connection is terminated (in operation S35). When the management OS 101 does not receive, from the terminal device 2, the notification that indicates that the remote connection is terminated (No in operation S35), the management OS 101 continues the remote connection until the terminal device 2 notifies the server device 1 that the remote connection is terminated. When the management OS 101 receives, from the terminal device 2, the notification that indicates that the remote connection is terminated (Yes in operation S35), the management OS 101 terminates the remote connection and synchronizes the VM information between the server device 1 and the terminal device 2 (in operation S36). Then, the management OS 101 terminates the process.

On the other hand, when the management OS 101 receives the connection request from the thin client terminal 5 (No in operation S21 of FIG. 8), the management OS 101 performs a process of allowing the thin client terminal to use the server VM (in operation S23).

Figure 10:
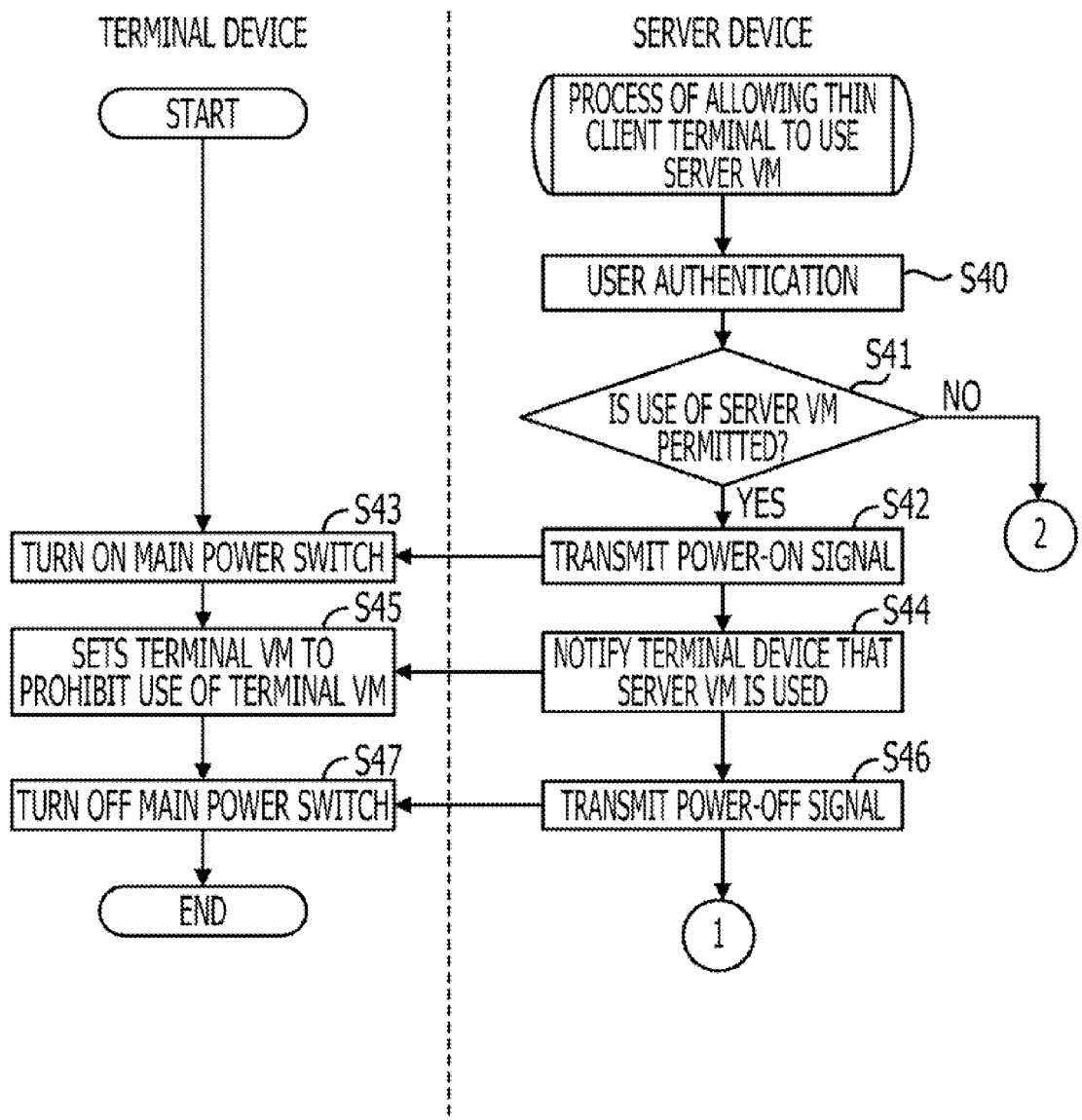
FIG. 10 is a flowchart of a process of allowing a thin client terminal to use the VM, while the process is performed by the server device and the terminal device.
Figure 11:
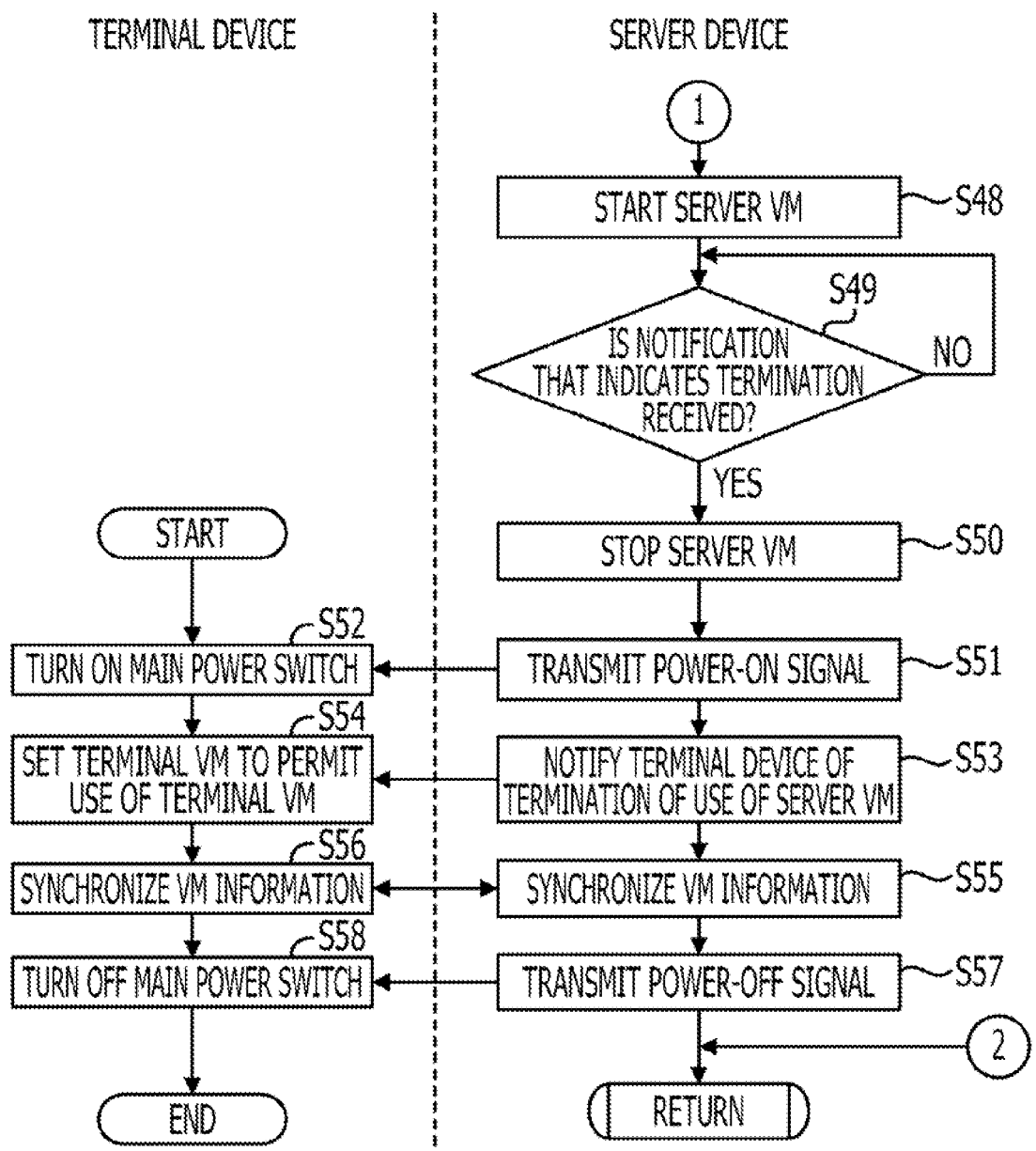
FIG. 11 is a flowchart of the process of allowing the thin client terminal to use the VM, while the process is performed by the server device and the terminal device.

FIGS. 10 and 11 are a flowchart of the process of allowing the thin client terminal to use the server VM, while the process is performed by the server device 1 and the terminal device 2. In each of FIGS. 10 and 11, a process that is performed by the terminal device 2 is illustrated together with a process that is performed by the server device 1.

In the server device 1, the management OS 101 references the VM management table and performs a user authentication on the basis of the user ID and the password that are included in the received connection request (in operation S40). In this case, when the user authentication cannot be successfully performed, the management OS 101 may transmit an error message to the thin client terminal 5. After operation S40, the management OS 101 determines whether or not use of the corresponding server VM 102 is permitted (in operation S41). For example, when the terminal device 2 is in the offline state and whereby use of the server VM 102 is prohibited (No in operation S41), the process that is performed by the server device 1 is terminated. In this case, the management OS 101 transmits, to the thin client terminal 5, a notification that indicates that use of the server VM 102 is prohibited.

When use of the server VM is permitted (Yes in operation S41), the management OS 101 transmits the power-on signal to the terminal device 2 (in operation S42). In the terminal device 2, the power control unit 206 receives the power-on signal and turns on the main power switch (in operation S43). Then, the VMM 200 and the management OS 201 operate on the terminal device 2. The server device 1 notifies the terminal device 2 that the server VM is used by the thin client terminal 5 (in operation S44). After the terminal device 2 is notified by the server device 1, the VM usage permission/prohibition setting unit 221 of the terminal device 2 sets the terminal VM 202 to prohibit use of the terminal VM 202 (in operation S45). Thus, the user is prohibited to use the terminal VM 202. Therefore, use of the terminal VM 202 that has the same VM_ID as the server VM 102 is prohibited.

The management OS 101 of the server device 1 transmits the power-off signal to the terminal device 2 (in operation S46). The power control unit 206 of the terminal device 2 receives the power-off signal and turns off the main power switch (in operation S47). When the main power switch is already in the ON state, operations S42 to S47 of controlling the main power switch may be omitted.

In the server device 1, the management OS 101 starts the server VM 102 (in operation S48). Then, the guest OS runs on the executed server VM 102. When the server VM 102 notifies the thin client terminal 5 of a device connected to the guest OS, the remote connection to the thin client terminal 5 is established. When the remote connection is established, the server VM 102 of the server device 1 receives, from the thin client terminal 5, information entered by an operation with the keyboard and mouse of the thin client terminal 5, and transmits, to the thin client terminal 5, the results of a process performed by the server VM 102.

The management OS 101 determines whether or not the management OS 101 receives, from the thin client terminal 5, a notification that indicates that the remote connection is terminated (in operation S49). When the thin client terminal 5 receives information on a user operation, for example, when a power supply button of the thin client terminal 5 is turned off, the thin client terminal 5 transmits, to the server device 1, the notification that indicates that the remote connection is terminated. When the management OS 101 does not receive, from the thin client terminal 5, the notification that indicates that the remote connection is terminated (NO in operation S49), the management OS 101 continues the remote connection until the management OS 101 receives the notification that indicates that the remote connection is terminated. When the management OS 101 receives, from the thin client terminal 5, the notification that indicates that the remote connection is terminated (Yes in operation S49), the management OS 101 stops the server VM 102 (in operation S50).

Next, the management OS 101 transmits the power-on signal to the terminal device 2 (in operation S51). In the terminal device 2, the power control unit 206 receives the power-on signal and turns on the main power switch (in operation S52). Then, the VMM 200 and the management OS 201 operate on the terminal device 2 (in operation S52). The server device 1 notifies the terminal device 2 that the thin client terminal 5 terminates the use of the server VM (in operation S53). In the terminal device 2, the VM usage permission/prohibition setting unit 221 sets the terminal VM 202 to permit use of the terminal VM 202 (in operation S54). The server device 1 and the terminal device 2 synchronize the VM information between the server device 1 and the terminal device 2 (in operations S55 and S56). The management OS 101 of the server device 1 transmits the power-off signal to the terminal device 2 (in operation S57). Then, the process that is performed by the server device 1 is terminated. In the terminal device 2, the power control unit 206 receives the power-off signal and turns off the main power switch (in operation S58). Then, the process that is performed by the terminal device 2 is terminated. When the main power switch of the terminal device 2 is already in the ON state, operations S51 to S58 of controlling the main power switch may be omitted.

When the server VM 102 is used by the thin client terminal 5, the VM information that is held by the server device 1 is changed. Thus, when the thin client terminal 5 terminates the use of the server VM 102, the change in the VM information is reflected in the terminal device 2. Therefore, the terminal device 2 holds the same VM information as the server device 1.

Figure 12:
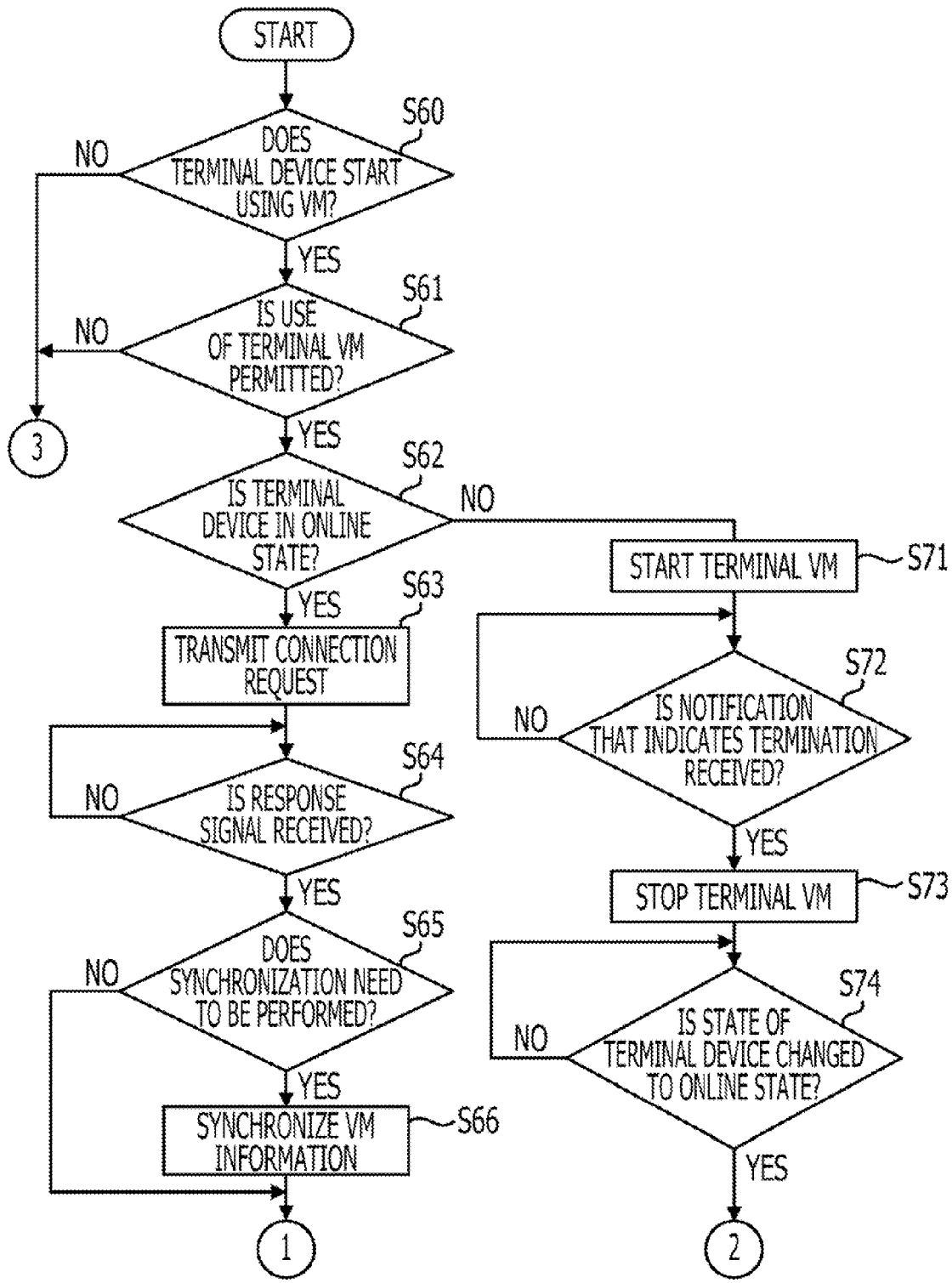
FIG. 12 is a flowchart of a process that is performed by the terminal device when the terminal device uses the VM.
Figure 13:
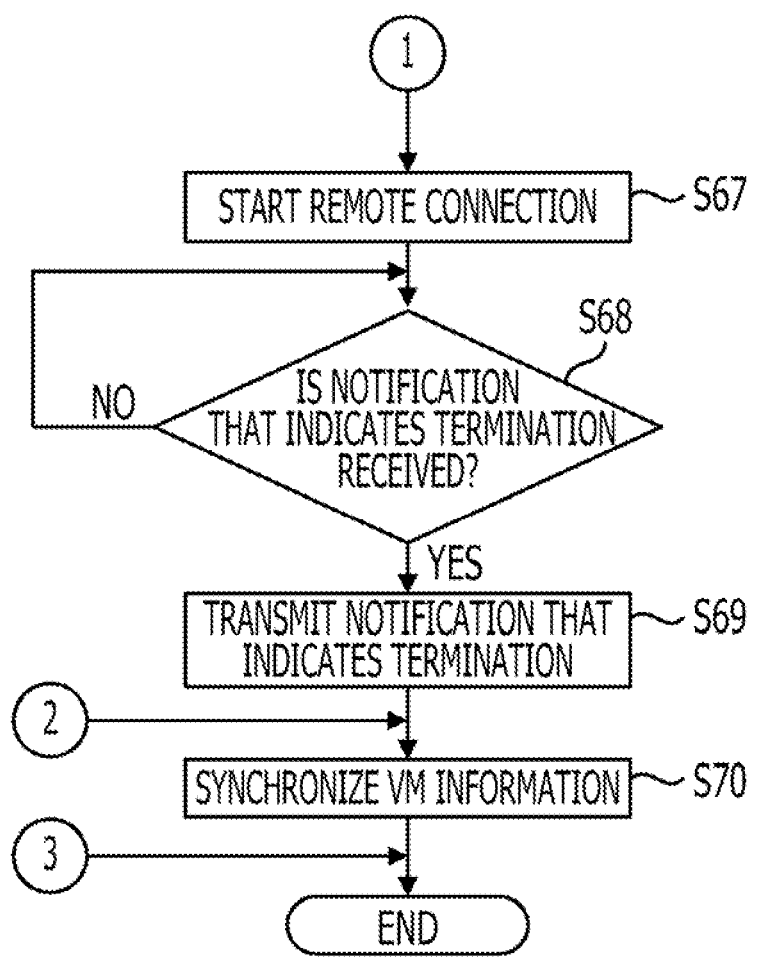
FIG. 13 is a flowchart of the process that is performed by the terminal device when the terminal device uses the VM.

FIGS. 12 and 13 are flowcharts of a process that is performed by the terminal device 2 in order to use the VM.

The management OS 201 determines whether or not the terminal device 2 starts using the VM (in operation S60). The management OS 201 receives information on a user operation and determines that the terminal device 2 starts using the VM on the basis of the information on the user operation. When the terminal device 2 does not start using the VM (No in operation S60), the management OS 201 terminates the process. When the terminal device 2 starts using the VM (Yes in operation S60), the management OS 201 determines whether or not use of the terminal VM 202 is permitted (in operation S61).

When the management OS 201 determines that use of the terminal VM 202 is prohibited (No in operation S61), the server VM 102 that has the same VM information as the terminal VM 202 is operating on the server device 1 and being used by the thin client terminal 5, and the management OS 201 determines that the VM cannot be used by the terminal device 2. Then, the management OS 201 terminates the process. When the management OS 201 determines that use of the terminal VM 202 is permitted (Yes in operation S61), the management OS 201 determines whether or not the terminal device 2 is in the online state (in operation S62).

When the terminal device 2 is in the online state (Yes in operation S62), the management OS 201 transmits the connection request to the server device 1 in order to use the server VM 102 (in operation S63). In this case, the management OS 201 transmits the connection request that includes the user ID and the password that have been entered by the user. Then, the management OS 201 determines whether or not the management OS 201 receives a signal (response signal) transmitted in response to the transmitted connection request (in operation S64). When the management OS 201 does not receive the response signal (No in operation S64), the management OS 201 stands by until the management OS 201 receives the response signal. In this case, when the terminal device 2 does not receive the response signal for a certain time period, the management OS 201 may treats the transmitted connection request as an error.

When the management OS 201 receives the response signal (Yes in operation S64), the management OS 201 determines whether or not the VM information needs to be synchronized between the server device 1 and the terminal device 2 (in operation S65). When the VM information needs to be synchronized between the server device 1 and the terminal device 2 (Yes in operation S65), the management OS 201 synchronizes the VM information between the server device 1 and the terminal device 2 (in operation S66). Thus, when the terminal device 2 is in the offline state, the terminal VM 202 is used by the terminal device 2. When the VM information is changed, the change in the VM information is reflected in the server device 1. Thus, the same VM can operate on the server device 1 and the terminal device 2.

The management OS 201 establishes, according to the received response signal, the remote connection to the guest OS that runs on the server VM executed on the server device 1 (in operation S67). For example, the received response signal includes an address that allows the terminal device 2 to be connected to the guest OS that runs on the server device 1. The management OS 201 starts the remote control client 224 so that the remote control client 224 is connected to the guest OS. The remote control client 224 receives information on a user operation and transmits the information to the guest OS of the server VM 102. Then, the remote control client 224 receives information on a screen to be displayed as a result of the reception of the information on the user operation and causes the received information to be displayed on the monitor of the terminal device 2.

The management OS 201 determines whether or not the management OS 201 receives a notification that indicates termination of the remote connection (in operation S68). When the management OS 201 receives information on a user operation such as an operation of turning off a power supply button, the management OS 201 terminates the remote connection. When the management OS 201 does not receive the notification that indicates termination of the remote connection (No in operation S68), the management OS 201 continues the remote connection until the management OS 201 receives the notification that indicates termination of the remote connection. When the management OS 201 receives the notification that indicates termination of the remote connection (Yes in operation S68), the management OS 201 transmits, to the server device 1, the notification that indicates termination of the remote connection (in operation S69). After that, the management OS 201 synchronizes the VM information between the server device 1 and the terminal device 2 (in operation S70) and terminates the process. Specifically, the VM information is synchronized between the server device 1 and the terminal device 2 when the use of the VM is terminated. When the user uses the VM again after the termination of the use of the VM, the VM can be executed on the server device 1 and the terminal device 2 according to the same VM information. As described above, whether to terminate the remote connection is determined on the basis of reception of the notification. However, the remote connection monitoring unit 130 may determine whether or not the remote connection is terminated.

When the management OS 201 determines that the terminal device is not in the online state (No in operation S62), the management OS 201 executes the terminal VM 202 (in operation S71). The user may operate the terminal VM 202 that operates on the terminal device 2. For example, the guest OS runs on the executed terminal VM 202. The management OS 201 executes the remote control client 224 so that the remote control client 224 is connected to the guest OS that runs on the terminal VM 202. The remote control client 224 receives information on a user operation and transmits the received information to the guest OS that runs on the server VM 102. Then, the remote control client 224 receives information regarding a screen to be displayed as a result of the reception of the information on the user operation and causes the received information to be displayed on the monitor of the terminal device 2.

The management OS 201 determines whether or not the management OS 201 receives a notification that indicates that the use of the terminal VM 202 is terminated (in operation S72). When the management OS 201 does not receive the notification that indicates that the use of the terminal VM 202 is terminated (No in operation S72), the management OS 201 causes the terminal device 2 to continuously use the terminal VM 202. When the management OS 201 receives the notification that indicates that the use of the terminal VM 202 is terminated (Yes in operation S72), the management OS 201 stops the terminal VM 202 (in operation S73) and determines whether or not the state of the terminal device 2 is changed to the online state (in operation S74). When the state of the terminal device 2 is changed to the online state (Yes in operation S74), the management OS 201 causes the process to proceed to operation S70 so as to synchronize the VM information between the terminal device 2 and the server device 1. When the state of the terminal device 2 is not changed to the online state (No in operation S74), the management OS 201 stands by until the state of the terminal device 2 is changed to the online state. As described above, after the terminal device 2 in the offline state terminates the use of the terminal VM 202, the VM information is synchronized between the server device 1 and the terminal device 2. After that, the terminal device 2 in the online state can efficiently use the server VM 102.

As described above, when the terminal device 2 is in the online state, the terminal device 2 uses the server VM. When the terminal device 2 is in the offline state, the terminal device 2 uses the terminal VM. Thus, even when the terminal device 2 is not connected to the network N, the user may use the terminal VM 202. In addition, when the terminal device 2 starts using the server VM and terminates the use of the server VM, the terminal device 2 synchronizes the VM information between the server device 1 and the terminal device 2. Therefore, the terminal device 2 holds the latest VM information.

As described above, in the present embodiment,

The server VM 102 operates on the server device 1, and the terminal VM 202 operates on the terminal device 2. When either the server VM 102 or the terminal VM 202 is used, use of the other of the VMs 102 and 202 is prohibited. Thus, the server VM 102 and the terminal VM 202, which have the same VM information, are not used simultaneously.

Second Embodiment

The second embodiment is described below. In the second embodiment, the terminal device 2 has a function of notifying the user that the terminal device 2 uses either the server VM or the terminal VM. The notifying function is described below.

Figure 14A:
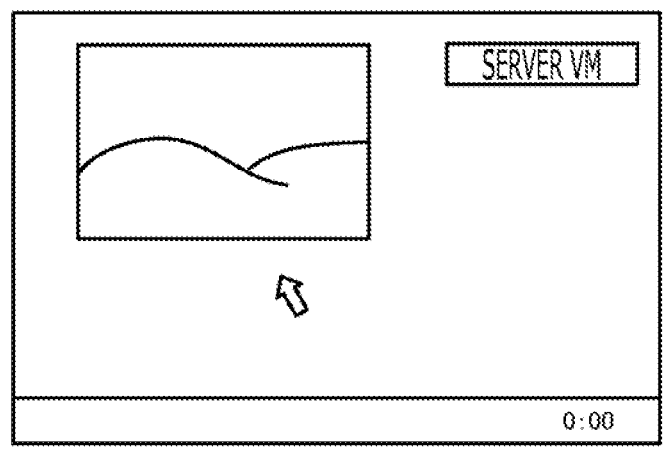
FIG. 14A is a diagram illustrating an example of a monitor that is included in the terminal device and displays the results of a process performed by the VM.
Figure 14B:
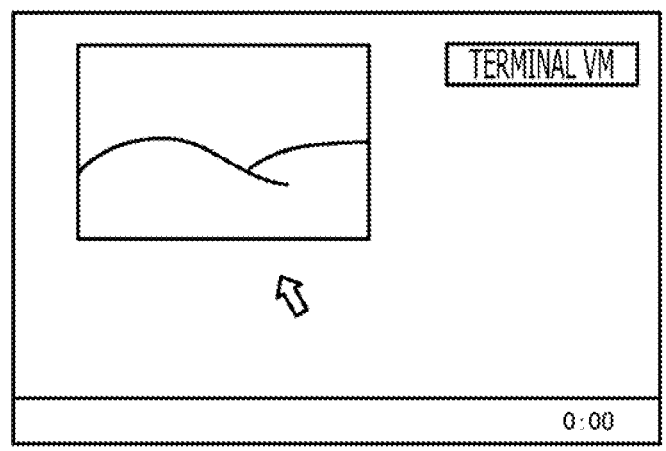
FIG. 14B is a diagram illustrating an example of the monitor that is included in the terminal device and displays the results of a process performed by the VM.

FIGS. 14A and 14B are diagrams each illustrating an example of the monitor of the terminal device 2. In FIGS. 14A and 14B, the results of the process performed by the VM are displayed on the monitor of the terminal device 2. When the terminal device 2 uses the server VM 102, the management OS 101 notifies the terminal device 2 of a location at which the guest OS of the server VM 102 is executed, and an image that indicates that the VM that is being used is the server VM 102 is displayed on the upper right side of a monitor screen of the guest OS (refer to FIG. 14A). Thus, a screen illustrated in FIG. 14A is displayed on the upper right side of the screen of the terminal device 2. In addition, when the terminal device 2 uses the terminal device VM 202, the management OS 201 notifies the terminal device 2 of a location at which the guest OS of the terminal VM 202 is executed, and an image that indicates that the VM that is being used is the terminal VM 202 is displayed on the upper right side of the monitor screen of the guest OS (refer to FIG. 14B). Thus, a screen illustrated in FIG. 14B is displayed on the upper right side of the screen of the terminal device 2. When the screen illustrated in FIGS. 14A or 14B is displayed, the user recognizes the VM that is being used. In addition, the user can recognize whether the terminal device 2 is in the online state or the offline state by viewing the displayed image.

FIG. 15 is a block diagram illustrating functions that are included in the server device 1.

The management OS 101 of the server device 1 according to the present embodiment includes the functions described in the first embodiment and a function that is a VM execution location notifying unit 129. The VM execution location notifying unit 129 detects execution of the server VM 102 and notifies a VM execution location display unit 131 that a location at which the VM is executed is the server device 1. The VM execution location display unit 131 is present in the guest OS executed on the server VM 102 and displays the notified location on the screen of the guest OS executed on the server VM 102.

Figure 16:
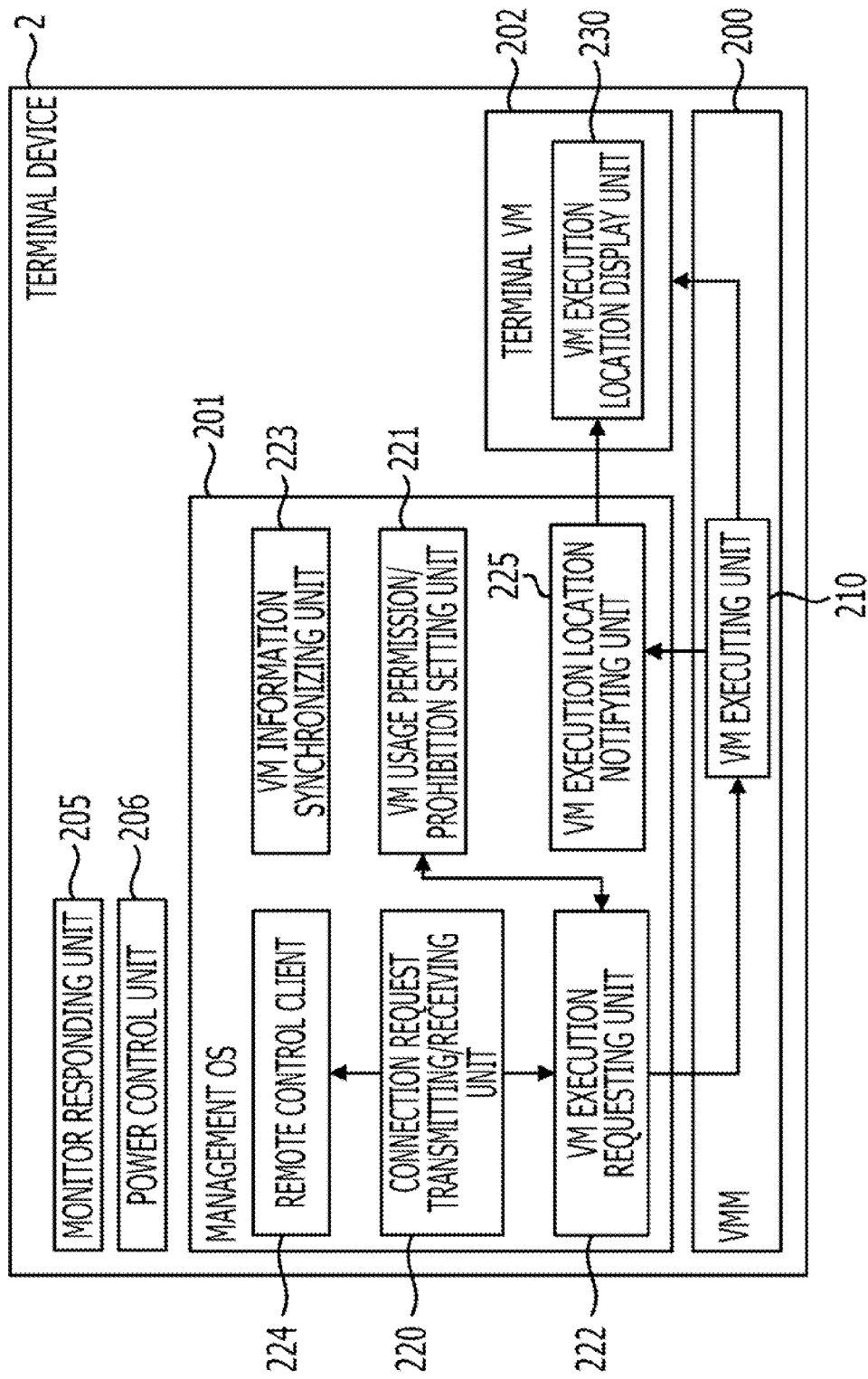
FIG. 16 is a block diagram illustrating functions that are included in the terminal device.

FIG. 16 is a block diagram illustrating functions that are included in the terminal device 2.

The management OS 201 of the terminal device 2 according to the present embodiment includes the functions described in the first embodiment and a function that is a VM execution location notifying unit 225. The VM execution location notifying unit 225 detects execution of the terminal VM 202 and notifies a VM execution location display unit 230 that a location at which the VM is executed is the terminal device 2. The VM execution location display unit 230 is present in the guest OS executed on the terminal VM 202 and displays the notified location on the screen of the guest OS executed on the terminal VM 202.

Figure 17:
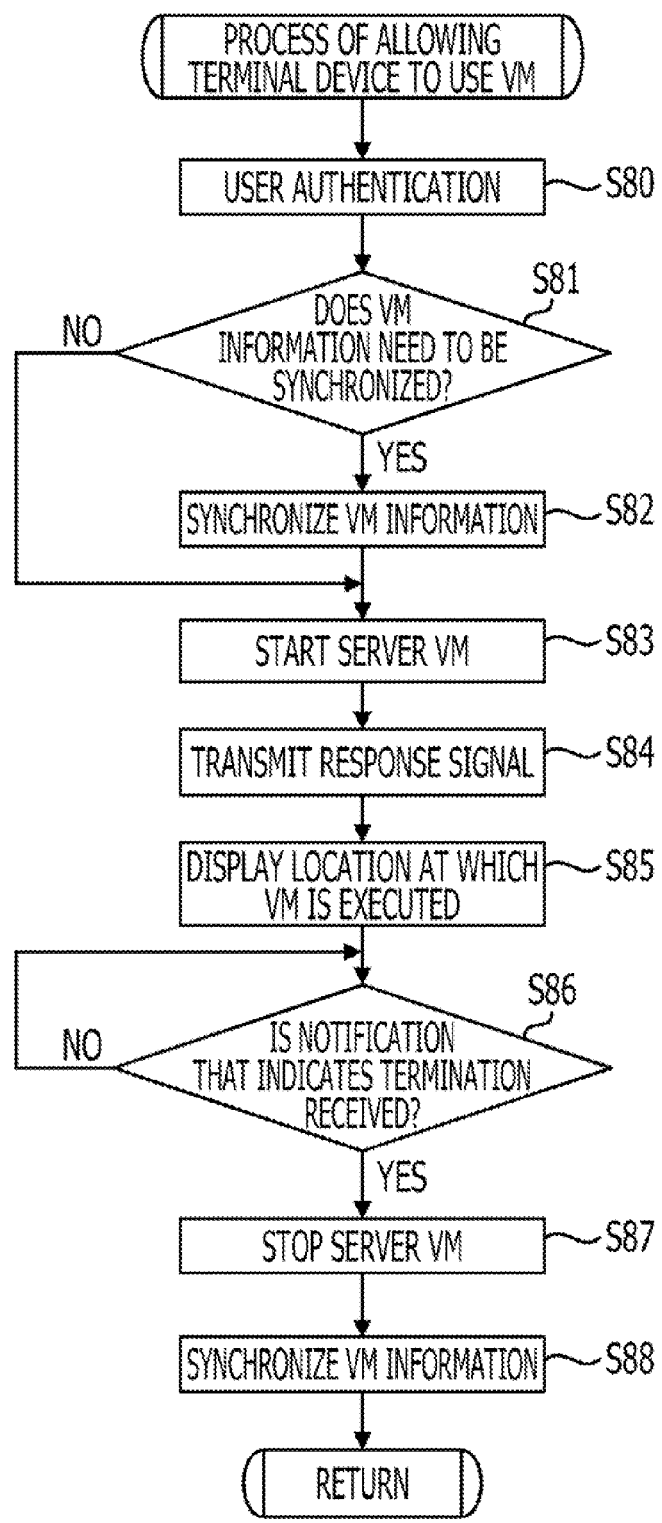
FIG. 17 is a flowchart of a process of allowing the terminal device to use the VM, while the process is performed by the server device.

FIG. 17 is a flowchart of a process of allowing the terminal device 2 to use the server VM, while the process is performed by the server device 1. When the management OS 101 receives the connection request from the terminal device 2, the management OS 101 performs the process illustrated in FIG. 17.

The management OS 101 performs a user authentication on the basis of the user ID and the like that are included in the connection request received from the terminal device 2 (in operation S80). Next, the management OS 101 determines whether or not the VM information needs to be synchronized between the server device 1 and the terminal device 2 (in operation S81). When the management OS 101 determines that the VM information needs to be synchronized (Yes in operation S81), the management OS 101 synchronizes the VM information between the server device 1 and the terminal device 2 (in operation S82). After the synchronization or when the VM information is not synchronized (No in operation S81), the management OS 101 executes the server VM 102 (in operation S83) and transmits, to the terminal device 2, a signal (response signal) in response to the received connection request (in operation S84). The server VM 102 displays, on the screen of the guest OS, the location at which the VM is being executed and used (in operation S85). Thus, characters, "SERVER VM", are displayed on the monitor of the terminal device 2 as illustrated in FIG. 14A. Therefore, the user recognizes that the server VM is being used.

The management OS 101 determines whether or not the management OS 101 receives, from the terminal device 2, a notification that indicates termination of the remote connection (in operation S86). When the server device 1 does not receive, from the terminal device 2, the notification that indicates termination of the remote connection (No in operation S86), the management OS 101 continues the remote connection until the management OS 101 receives, from the terminal device 2, the notification that indicates termination of the remote connection. When the management OS 101 receives, from the terminal device 2, the notification that indicates termination of the remote connection (Yes in operation S86), the management OS 101 terminates the remote connection and stops the server VM 102 (in operation S87). After that, the management OS 101 synchronizes the VM information between the server device 1 and the terminal device 2 (in operation S88) and terminates the process.

Figure 18:
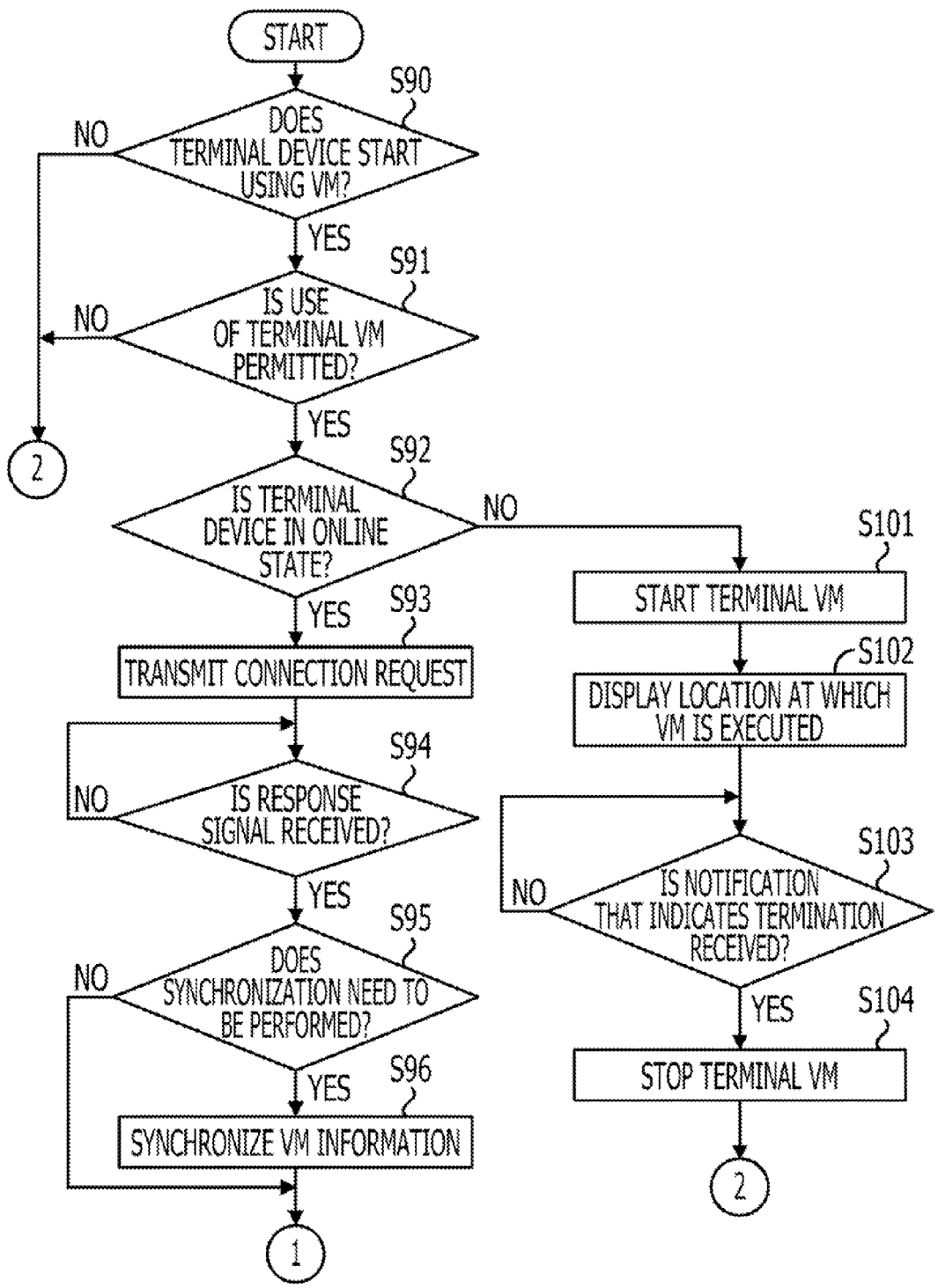
FIG. 18 is a flowchart of a process that is performed by the terminal device.
Figure 19:
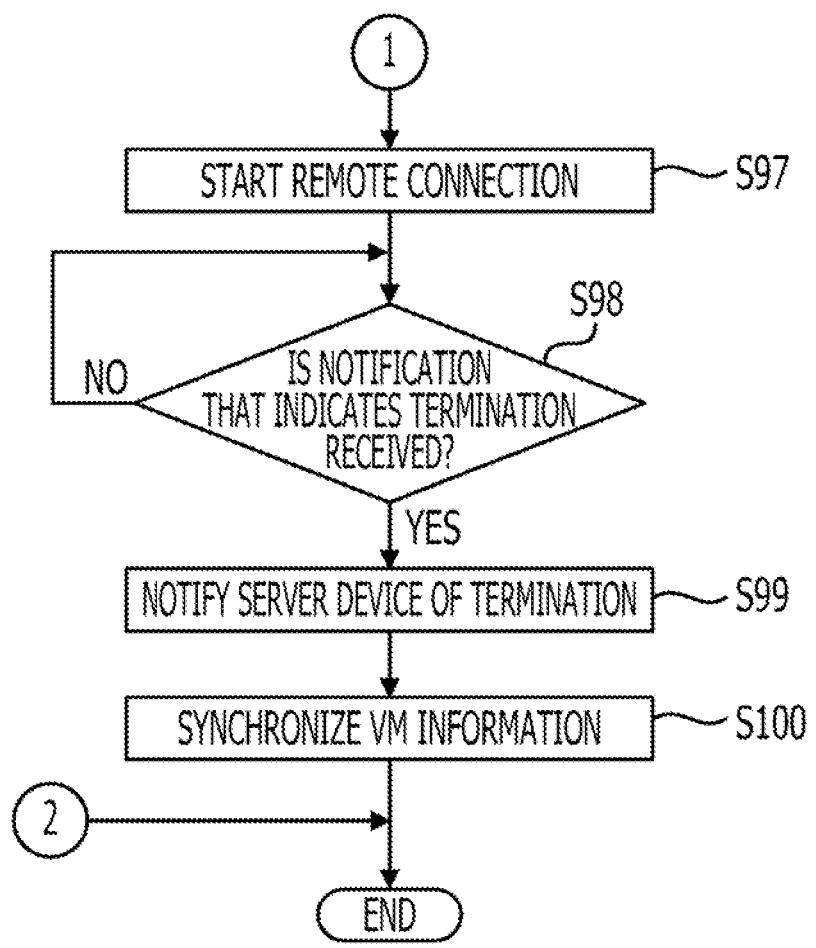
FIG. 19 is a flowchart of the process that is performed by the terminal device.

FIGS. 18 and 19 are flowcharts of a process that is performed by the terminal device 2.

The management OS 201 determines whether or not the terminal device 2 starts using the VM (in operation S90). When the terminal device does not start using the VM (No in operation S90), the management OS 201 terminates the process. When the terminal device 2 starts using the VM (Yes in operation S90), the management OS 201 determines whether or not use of the terminal VM 202 is permitted (in operation S91).

When use of the terminal VM 202 is prohibited (No in operation S91), the management OS 201 terminates the process. When use of the terminal VM 202 is permitted (Yes in operation S91), the management OS 201 determines whether or not the terminal device 2 is in the online state (in operation S92). When the terminal device 2 is in the online state (Yes in operation S92), the management OS 201 transmits the connection request to the server device 1 (in operation S93). The management OS 201 then determines whether or not the management OS 201 receives a signal (response signal) transmitted in response to the connection request transmitted by the management OS 201 (in operation S94). When the management OS 201 does not receive the response signal (No in operation S94), the management OS 201 stands by until the management OS 201 receives the response signal.

When the management OS 201 receives the response signal (Yes in operation S94), the management OS 201 determines whether or not the server device 1 requests the terminal device 2 to synchronize the VM information (in operation S95). When the management OS 201 determines that the server device 1 does not request the terminal device 2 to synchronize the VM information (No in operation S95), the management OS 201 causes the process to return to operation S97. When the management OS 201 determines that the server device 1 requests the terminal device 2 to synchronize the VM information (Yes in operation S95), the management OS 201 synchronizes the VM information between the server device 1 and the terminal device 2 (in operation S96). The management OS 201 then establishes the remote connection to the guest OS that operates on the server VM of the server device 1 (in operation S97). Thus, the server VM may be used by the terminal device 2.

The management OS 201 determines whether or not the management OS 201 receives a notification that indicates termination of the remote connection (in operation S98). When the terminal device 2 does not receive the notification that indicates termination of the remote connection (No in operation S98), the management OS 201 continues the remote connection until the management OS 201 receives the notification that indicates termination of the remote connection. When the terminal device 2 receives the notification that indicates termination of the remote connection (Yes in operation S98), the management OS 201 notifies the server device 1 of termination of the remote connection (in operation S99). After that, the management OS 201 synchronizes the VM information between the server device 1 and the terminal device 2 (in operation S100) and then terminates the process.

When the management OS 201 determines that the terminal device 2 is not in the online state (No in operation S92), the management OS 201 starts the terminal VM 202 (in operation S101). The terminal VM 202 displays, on the screen of the guest OS, a location at which the VM is being executed and used (in operation S102). Thus, characters, "TERMINAL VM", are displayed on the monitor of the terminal device 2 as illustrated in FIG. 14B. Therefore, the user recognizes that the terminal VM is being used.

Next, the management OS 201 determines whether or not the management OS 201 receives a notification that indicates termination of the use of the terminal VM 202 (in operation S103). When the management OS 201 does not receive the notification that indicates termination of the use of the terminal VM 202 (No in operation S103), the management OS 201 causes the terminal device 2 to continuously use the terminal VM 202 until the management OS 201 receives the notification that indicates termination of the use of the terminal VM 202. When the terminal device 2 receives the notification that indicates termination of the use of the terminal VM 202 (Yes in operation S103), the management OS 201 stops the terminal VM 202 (in operation S104) and terminates the process.

As described above, in the present embodiment, when the terminal device 2 uses the server VM 102 or the terminal 202, the terminal device 2 displays the image that indicates that the server VM 102 or the terminal VM 202 is used. Thus, when the user views the displayed image, the user can recognize the VM that is being used. Therefore, the user can recognize whether the terminal device 2 is in the online state or the offline state.

Third Embodiment

The third embodiment is described below. In the third embodiment, the terminal device 2 has a function of limiting a time period for use of the terminal VM 202 of the terminal device 2 when the terminal device 2 is in the offline state.

FIG. 20 is a diagram illustrating an example of a setting screen that is used to limit the time period for use of the terminal VM 202.

The time period for use of the terminal VM 202 is set by an administrator of the server device 1, for example. The screen illustrated in FIG. 20 is displayed on a monitor by the management OS 101. When the server device 1 has a monitor, the screen illustrated in FIG. 20 may be displayed on the monitor of the server device 1. In addition, the terminal device 2 or the thin client terminal 5 may be connected to the server device 1, and the screen illustrated in FIG. 20 may be displayed on the monitor of the terminal device 2 or the monitor of the thin client terminal 5. The time period for use of the terminal VM 202 is determined using the setting screen. A user is selected on the setting screen so that the time period for use of the terminal VM is set for the selected user. The time period for use of the terminal VM 202 may be set for a plurality of users or all users. The time period for use of the terminal VM 202 may start from the time when the terminal VM is executed. In addition, the time period for use of the terminal VM 202 may start from the time when the state of the terminal device 2 is changed to the offline state.

Figure 21:
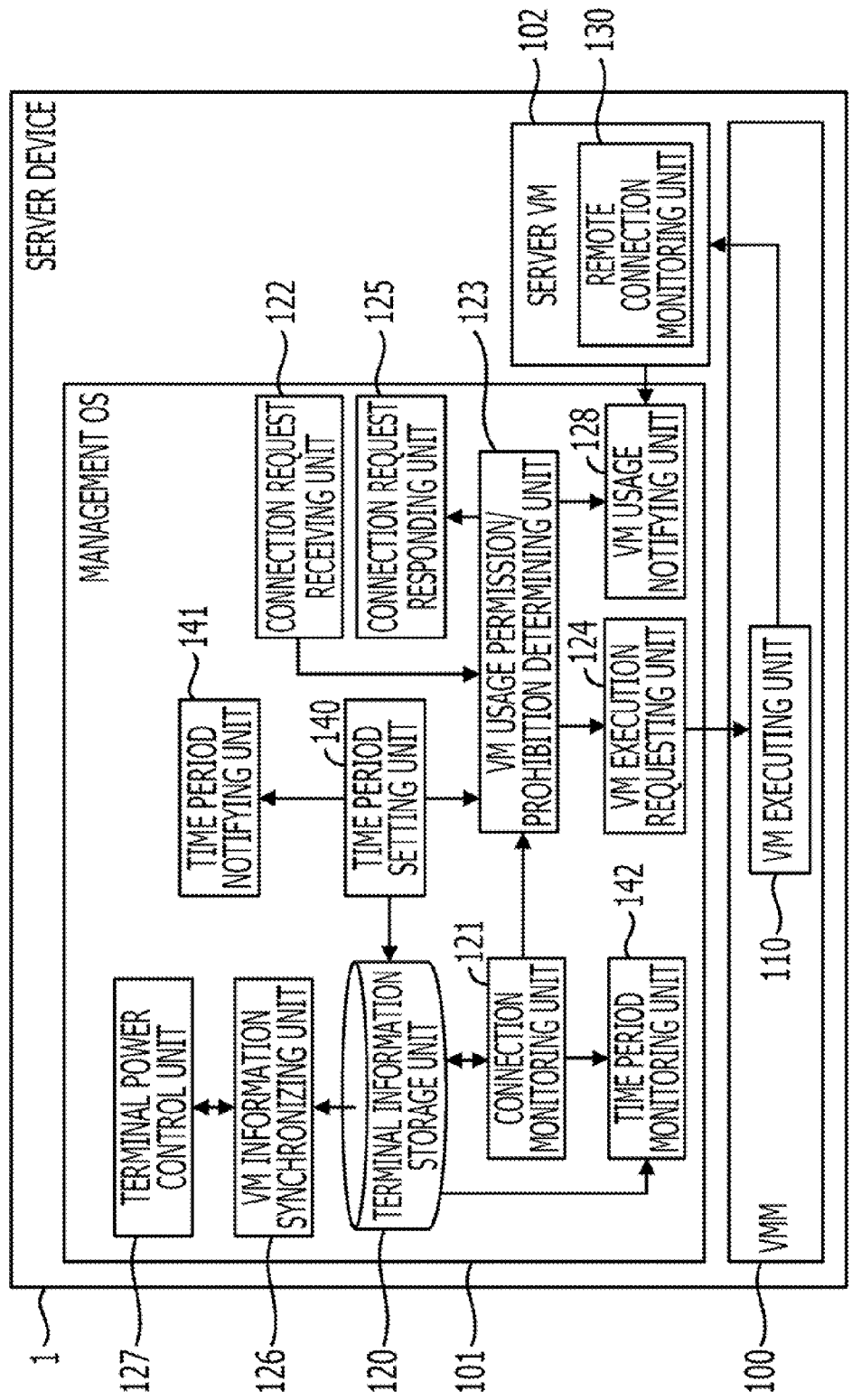
FIG. 21 is a block diagram illustrating functions that are included in the server device.

FIG. 21 is a block diagram illustrating functions that are included in the server device 1.

The management OS 101 of the server device 1 according to the present embodiment includes the functions described in the first embodiment and functions that are a time period setting unit 140, a time period notifying unit 141 and a time period monitoring unit 142. The time period setting unit 140 displays the screen illustrated in FIG. 20 on the monitor. When the state of the terminal device 2 is changed to the offline state, the time period setting unit 140 sets the time period for use of the terminal VM 202. The set time period for use of the terminal VM 202 is stored in the VM management table or the like, while the set time period for use of the terminal VM 202 is associated with the user ID in the VM management table or the like. The time period notifying unit 141 transmits, to the terminal device 2, a notification that indicates the time period set by the time period setting unit 140. When the VM information synchronizing unit 126 synchronizes the VM information, the time period notifying unit 141 may transmits, to the terminal device 2, the notification that indicates the time period set by the time period setting unit 140. The time period monitoring unit 142 monitors whether or not the state of the terminal device 2 is changed to the online state within the set time period. When the state of the terminal device 2 is not changed to the online state after the set time period elapses, the VM usage permission/prohibition determining unit 123 permits use of the server VM 102.

Figure 22:
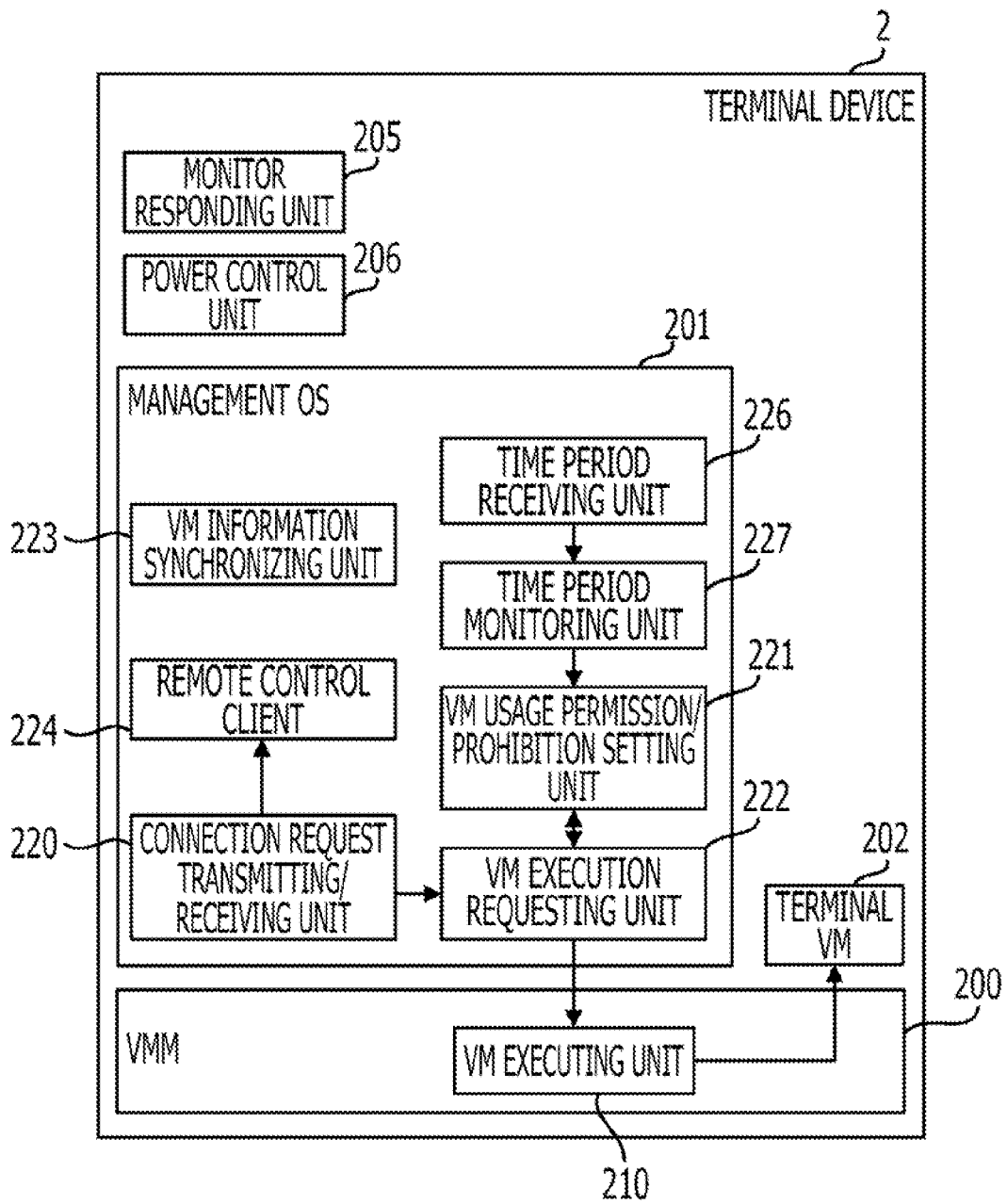
FIG. 22 is a block diagram illustrating functions that are included in the terminal device.

FIG. 22 is a block diagram illustrating functions that are included in the terminal device 2.

The management OS 201 of the terminal device 2 according to the present embodiment includes the functions described in the first embodiment and functions that are a time period receiving unit 226 and a time period monitoring unit 227. The time period receiving unit 226 receives, from the server device 1, the notification that indicates the time period for use of the terminal VM 202. When the state of the terminal device 2 is changed to the offline state, the time period monitoring unit 227 monitors whether or not the actual time period for use of the terminal VM 202 exceeds the time period that is indicated by the notification received by the time period receiving unit 226. When the actual time period for use of the terminal VM 202 exceeds the time period that is indicated by the notification received by the time period receiving unit 226, the VM usage permission/prohibition setting unit 221 prohibits use of the terminal VM 202. In addition, when the actual time period for use of the terminal VM 202 exceeds the time period that is indicated by the notification received by the time period receiving unit 226, the time period monitoring unit 227 deletes information that has been generated due to use of the terminal VM 202 and stored in the HDD 23, the RAM 23 or the like.

Figure 23:
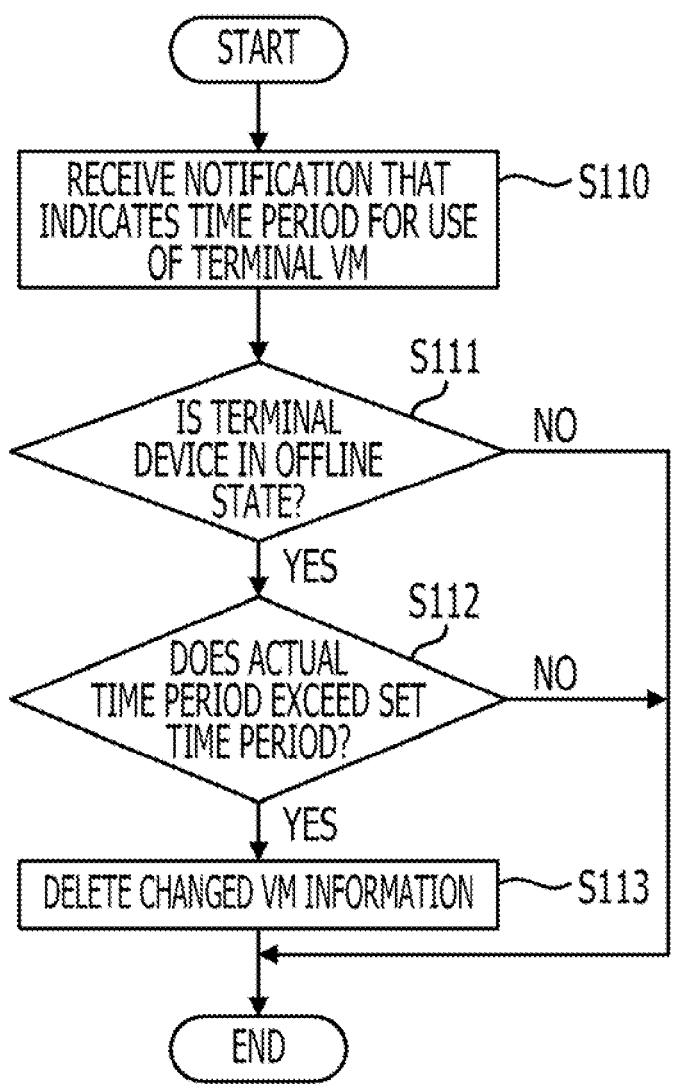
FIG. 23 is a flowchart of a process that is performed by the terminal device.

FIG. 23 is a flowchart of a process that is performed by the terminal device 2.

The management OS 201 receives, from the server device 1, the notification that indicates the time period (in operation S110). The management OS 201 then determines whether or not the terminal device 2 is in the offline state (in operation S111). When the terminal device 2 is not in the offline state (No in operation S111), the management OS 201 terminates the process. However, the management OS 201 periodically performs the process. When the terminal device 2 is in the offline state (Yes in operation S111), the management OS 201 determines whether or not the actual time period for use of the terminal VM 202 exceeds the set time period for use of the terminal VM 202 (in operation S112). When the management OS 201 determines that the actual time period for use of the terminal VM 202 does not exceed the set time period for use of the terminal VM 202 (No in operation S112), the management OS 201 terminates the process. When the management OS 201 determines that the actual time period for use of the terminal VM 202 exceeds the set time period for use of the terminal VM 202 (Yes in operation S112), the management OS 201 deletes changed VM information (in operation S113) and terminates the process. The changed VM information is information that indicates the results of a process performed by the terminal VM 202 and is stored in the HDD 23, the RAM 22 or the like. When the changed VM information is deleted, the state of the terminal VM 202 returns to the state of the terminal VM 202 before the terminal VM 202 was used. After that, the management OS 201 terminates the process as described above. When the number of times of use of the terminal VM 202 exceeds a set value or when the number of failures of the user authentications exceeds a set value, the terminal device 2 may be prohibited to use the terminal VM 202.

FIG. 24 is a flowchart of a process that is performed by the server device 1.

The management OS 101 sets the time period for use of the terminal VM 202 (in operation S120). After that, the management OS 101 notifies the terminal device 2 of the set time period (in operation S121). Next, the management OS 101 determines whether or not the terminal device 2 is in the offline state (in operation S122). When the terminal device is not in the offline state (No in operation S122), the management OS 101 repeats operation S122. When the terminal device is in the offline state (Yes in operation S122), the management OS 101 acquires the time period set for the user of the terminal device 2 and determines whether or not the actual time period for use of the terminal VM 202 exceeds the set time period (in operation S123).

When the management OS 101 determines that the actual time period for use of the terminal VM 202 does not exceed the set time period (No in operation S123), the management OS 101 performs operation S122. When the management OS 101 determines that the actual time period for use of the terminal VM 202 exceeds the set time period (Yes in operation S123), the management OS 101 changes the usage setting of the server VM 102 from prohibited to permitted (in operation S124). Then, the management OS 101 terminates the process.

As described above, in the present embodiment, even when the state of the terminal device 2 cannot be changed from the offline state to the online state, use of the server VM 102 is permitted after the certain time elapses. Thus, even when the state of the terminal device 2 cannot be changed to the online state due to the loss of the terminal device 2 or for another reason, it is possible to prevent use of the server VM 102 from being continuously prohibited, and avoid the problem that the thin client terminal 5 is prohibited to use the server VM 102.

The present embodiment is described above. However, the aforementioned configurations and operations may be changed when necessary and are not limited to the aforementioned embodiments.

The programs described in the embodiments are stored in a computer-readable storage medium and delivered. Examples of the computer-readable storage medium are a flexible disk, a hard disk, a compact disc-read only memory (CD-ROM), a DVD-ROM, a DVD-random access memory (DVD-RAM), a Blue-ray disc (BD), a USB memory, and another nonvolatile memory such as a flash memory. The computer programs may be transmitted through at least one of networks represented by an electric communication line, a wireless or cable communication line, the Internet and the like. However, the examples of the computer-readable storage medium do not include a carrier wave that includes the computer programs. Even if the computer programs are included in a carrier wave and carried by the carrier wave, a computer that is a transmission source of the programs has a readable storage medium. Thus, the computer-readable storage medium is a physically tangible storage medium.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. An information processing device comprising:
    a processor configured to
        operate a first virtual computer;
        store usage permission/prohibition information that indicates whether use of the first virtual computer is permitted in a management table;
        update the usage permission/prohibition information stored in the management table;
        control, based on the usage permission/prohibition information, whether use of the first virtual computer is permitted;
        monitor a first external device on which a second virtual computer to which the first virtual computer is switched operates and
        determine whether the first external device is connected,
        wherein when the processor determines that the first external device is not connected, the processor updates the usage permission/prohibition information stored in the management table so that the usage permission/prohibition information indicates that use of the first virtual computer is prohibited.

2. The information processing device according to claim 1, wherein the processor is further configured to synchronize information on the operational state of the first virtual computer with information on the operational state of the second virtual computer when the processor receives a request to start using the first virtual computer.

3. The information processing device according to claim 1, wherein the processor is further configured to synchronize information on the operational state of the first virtual computer with information on the operational state of the second virtual computer when the processor receives a request to terminate use of the first virtual computer from the second external device,
    wherein the processor transmits, to the first external device, the information that instructs the first external device to prohibit use of the second virtual computer.

4. The information processing device according to claim 1, wherein the processor is further configured to synchronize information on the operational state of the first virtual computer with information on the operational state of the second virtual computer when the processor determines that the first external device is not connected and that the processor receives a request to start using the first virtual computer.

5. The information processing device according to claim 1, wherein the processor is further configured to:
    set, in the management table, a time period for use of the second virtual computer that operates on the first external device; and
    determine whether an actual time period for use of the second virtual computer exceeds the set time period for use of the second virtual computer when the processor determines that the first external device is not connected,
    wherein the processor determines whether the first external device is connected when the actual time period for use of the second virtual computer exceeds the set time period for use of the second virtual computer, and
    wherein when the actual time period for use of the second virtual computer exceeds the set time period for use of the second virtual computer and the processor determines that the first external device is not connected, the processor updates the usage permission/prohibition information stored in the management table so that the usage permission/prohibition information indicates that use of the first virtual computer is permitted.

6. The information processing device according to claim 1, wherein the processor is further configured to notify an OS operating on the first virtual computer of a location at which the first virtual computer operates when the first virtual computer is used by the first external device.

7. The information processing device according to claim 1, wherein the processor transmits, to the first external device, information that instructs the first external device to cause the second virtual computer to operate,
    wherein the processor receives, from the first external device, a signal that indicates an operation of the second virtual computer, and
    wherein when the processor receives the signal that indicates the operation of the second virtual computer, the processor updates the usage permission/prohibition information stored in the management table so that the usage permission/prohibition information indicates that use of the first virtual computer is prohibited.

8. The information processing device according to claim 7, wherein the processor is further configured to synchronize information on the operational state of the first virtual computer with information on the operational state of the second virtual computer when the processor determines that the first external device is connected.

9. The information processing device according to claim 7, wherein the processor is further configured to:
- store information generated in a process performed by the first virtual computer; and
- determine whether an actual time period for use of the first virtual computer exceeds a set time period for use of the first virtual computer when the processor determines that the first external device is not connected, and delete the information stored when the actual time period for use of the first virtual computer exceeds the set time period for use of the first virtual computer.

10. The information processing device according to claim 1, wherein the processor is further configured to:
- monitor a second external device that uses the first virtual computer and on which the second virtual computer does not operate;
- receive a request to start using the first virtual computer from each of the first and second external devices;
- determine whether the processor receives the request from the first or second external device;
- wherein when the processor receives the request from the second external device and the first external device is connected, the processor transmits, to the first external device, information that instructs the first external device to prohibit use of the second virtual computer.

11. A computer system comprising:
- a server device on which a first virtual computer operates;
- a first terminal device that is connected to the server device and on which a second virtual computer to which the first virtual computer is switched operates; and
- a second terminal device that uses the first virtual computer and on which the second virtual computer does not operate,
- wherein the server device includes a processor configured to:
  - store usage permission/prohibition information that indicates whether use of the first virtual computer is permitted;
  - update the usage permission/prohibition information stored in the management table and control, based on the usage permission/prohibition information, whether use of the first virtual computer is permitted;
  - monitor the first terminal device and the second terminal device;
  - determine whether the first terminal device is connected, and
  - wherein when the processor determines that the first external device is not connected, the processor updates the usage permission/prohibition information stored in the management table so that the usage permission/prohibition information indicates that use of the first virtual computer is prohibited.

12. The computer system according to claim 11, wherein the first terminal device prohibits use of the second virtual computer when the first terminal device receives the information that instructs the first terminal device to prohibit use of the second virtual computer.

13. A non-transitory computer readable storage medium that stores a program that causes a computer to perform:
- operating a first virtual computer;
- determining whether a first external device on which a second virtual computer to which the first virtual computer is switched operates is connected;
- updating, when it is determined that the first external device is not connected, usage permission/prohibition information stored in a management table and indicating whether use of the first virtual computer is permitted so that the usage permission/prohibition information indicates that use of the first virtual computer is prohibited;
- controlling whether use of the first virtual computer is permitted based on the usage permission/prohibition information;
- determining, when a request to start using the first virtual computer is received, whether the request to start using the first virtual computer is transmitted by the first external device or a second external device on which the second virtual computer does not operate;
- transmitting, to the first external device, information that instructs the first external device to prohibit use of the second virtual computer when it is determined that the second external device transmits the request and that the first external device is connected.

14. The non-transitory computer readable storage medium according to claim 13, which stores the program that causes the computer to further perform:
- transmitting information that instructs the first external device to cause the second virtual computer to operate;
- determining whether the second virtual computer starts being used; and
- updating the usage permission/prohibition information stored in the management table and indicating whether use of the first virtual computer is permitted when it is determined that the second virtual computer starts being used.

15. A method for limiting use of a virtual computer, the method causing a computer to perform:
- operating a first virtual computer;
- determining whether a first terminal device on which a second virtual computer to which the first virtual computer is switched operates is connected;
- updating, when it is determined that the first terminal device is not connected, usage permission/prohibition information stored in a management table and indicating whether use of the first virtual computer is permitted so that the usage permission/prohibition information indicates that use of the first virtual computer is prohibited;
- controlling whether use of the first virtual computer is permitted based on the usage permission/prohibition information;
- determining, when a request to start using the first virtual computer is received, whether the request to start using the first virtual computer is transmitted by the first terminal device or a second terminal device on which the second virtual computer does not operate;
- transmitting, to the first terminal device, information that instructs the first terminal device to prohibit use of the second virtual computer when it is determined that the second terminal device transmits the request and that the first terminal device is connected.

* * * * *